INVENTORS
RICHARD H. AYRES
GAYLERD M. LIEDER
BY Dugger Johnson & Westman
ATTORNEYS

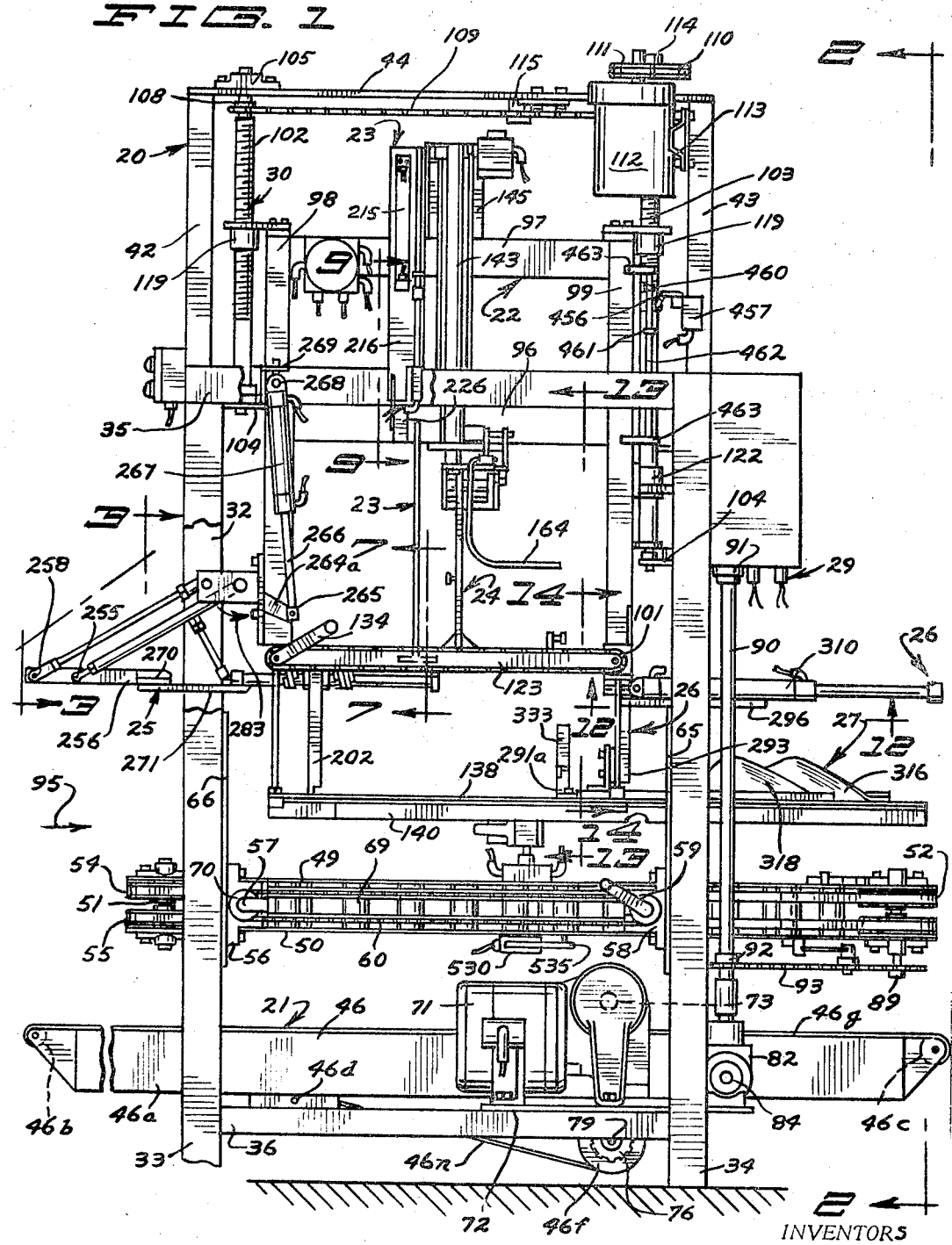

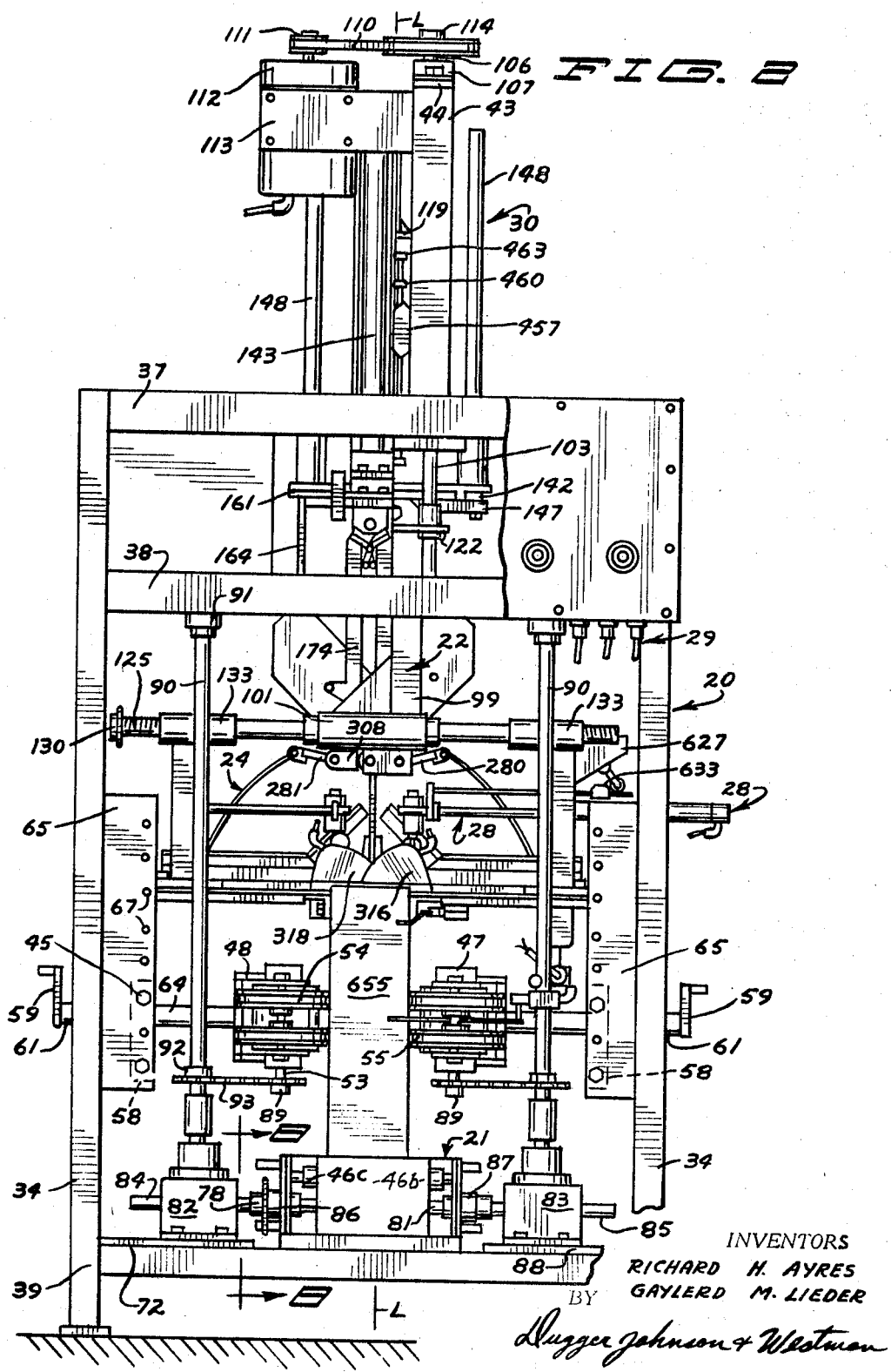

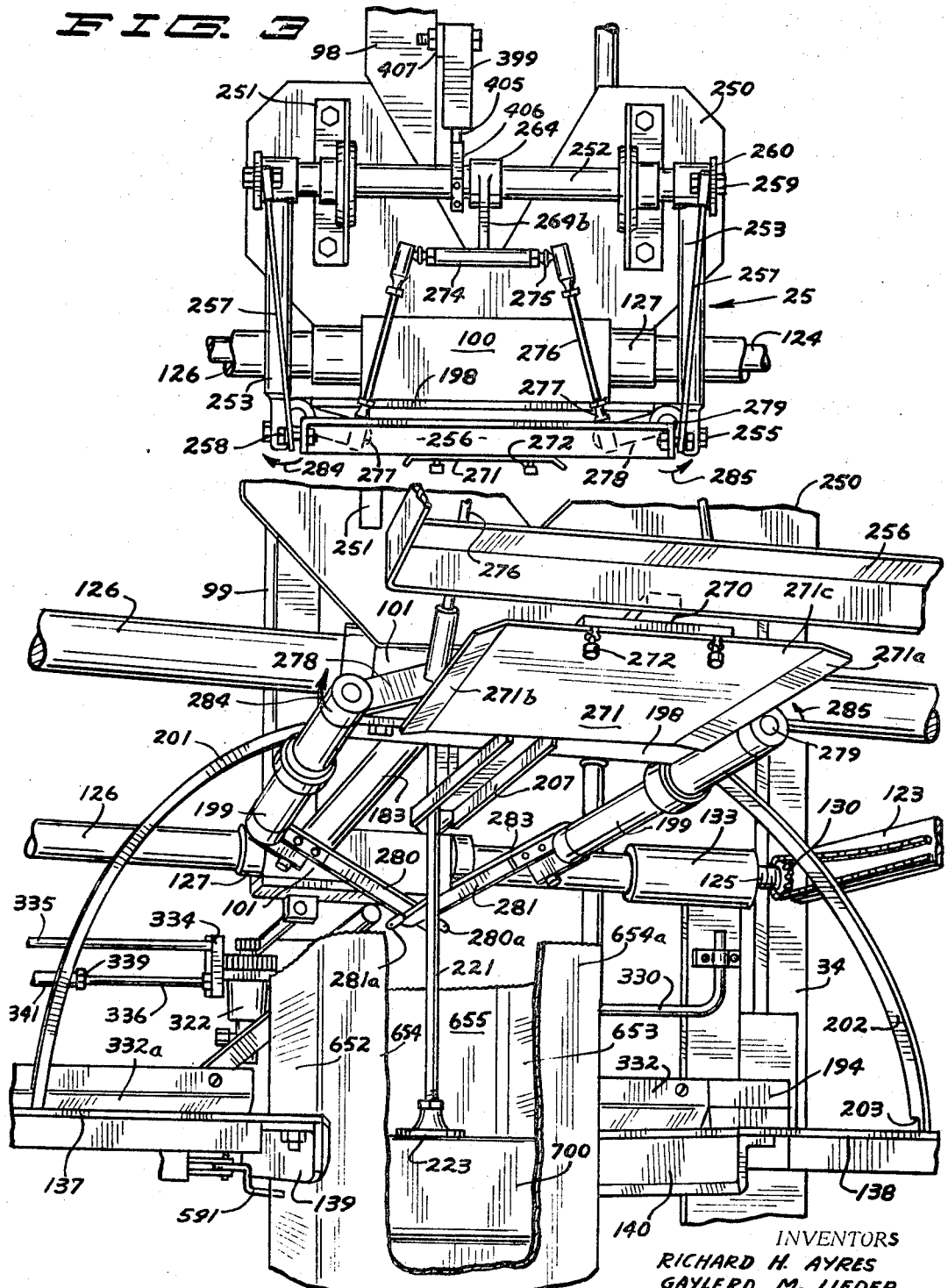

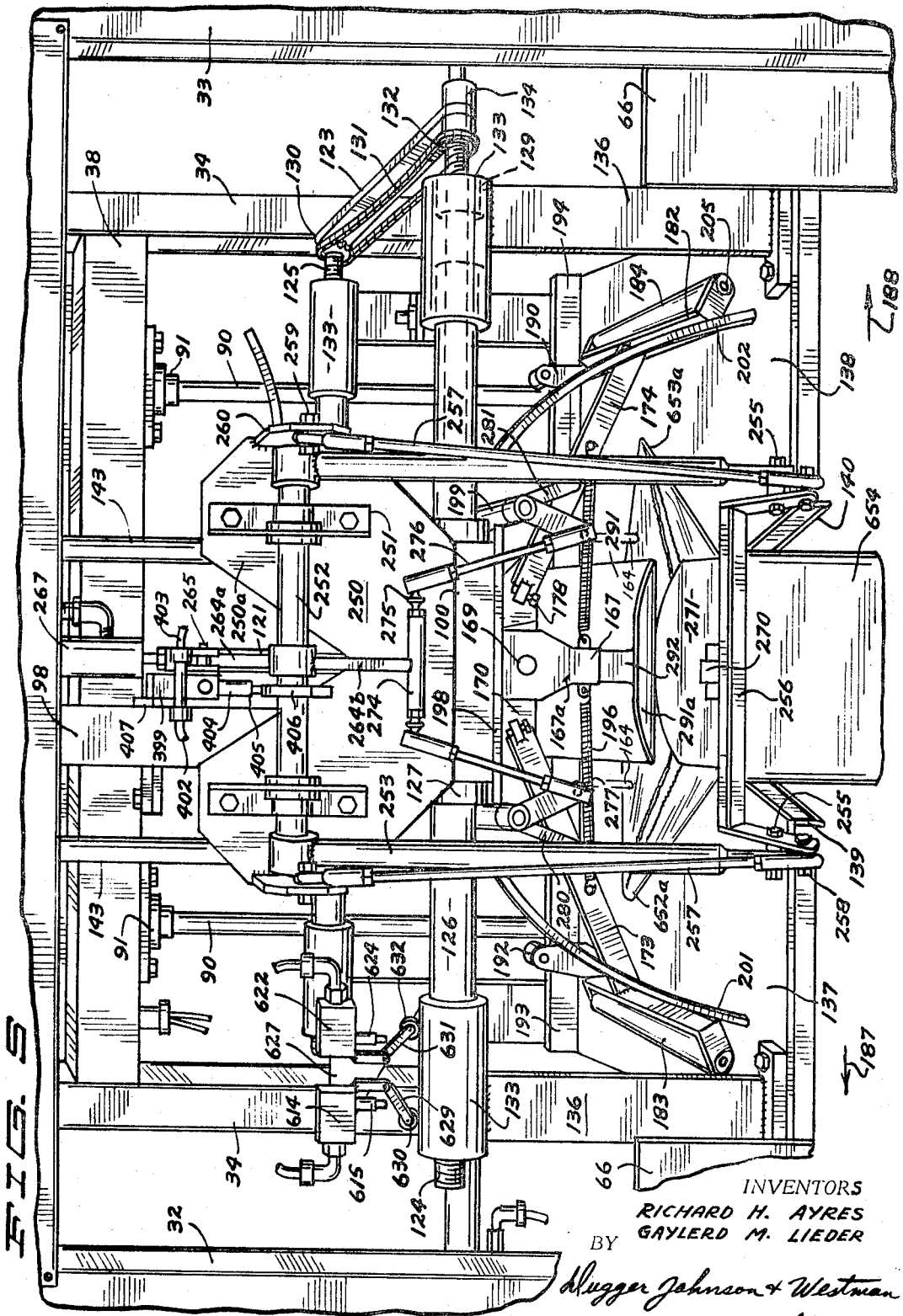

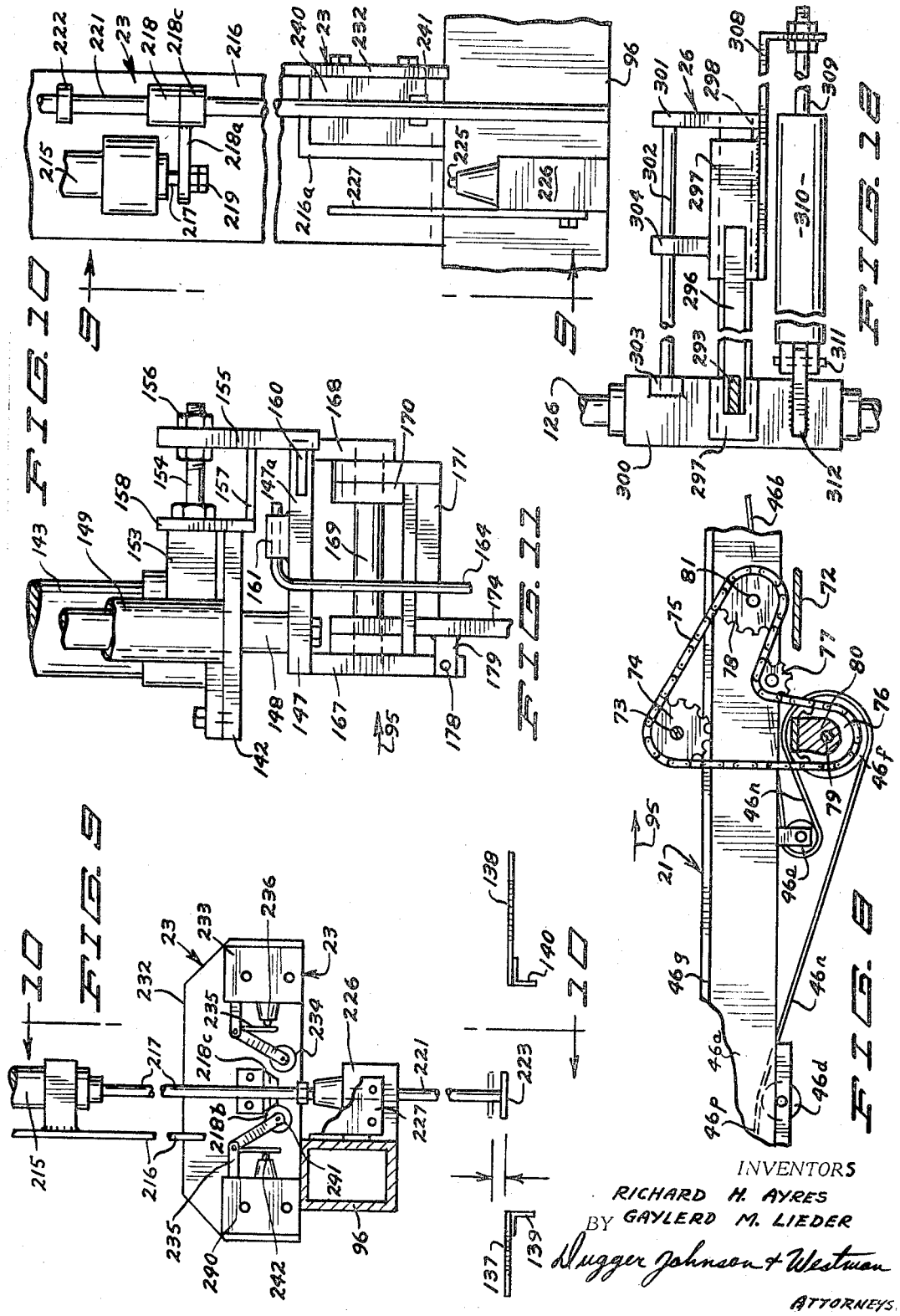

INVENTORS
RICHARD H. AYRES
GAYLERD M. LIEDER
BY
Dugger Johnson & Westman
ATTORNEYS Feb. 4, 1969  R. H. AYRES ET AL  3,425,183
BALER SEALER APPARATUS
Filed Aug. 16, 1965

INVENTORS
RICHARD H. AYRES
GAYLERD M. LIEDER
BY
Dugger Johnson & Westman
ATTORNEYS

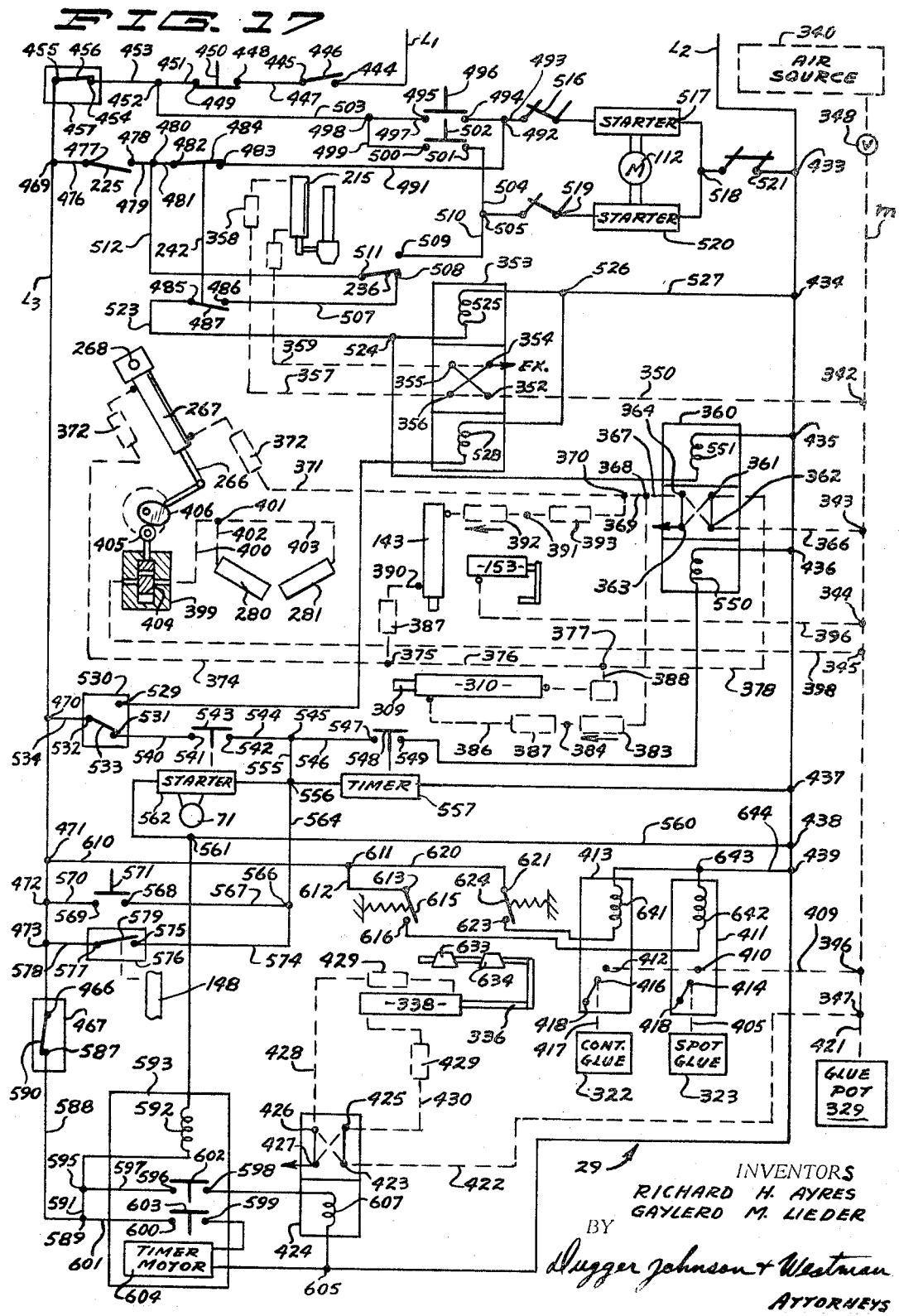

United States Patent Office 3,425,183
Patented Feb. 4, 1969

3,425,183
BALER SEALER APPARATUS
Richard H. Ayres and Gaylerd M. Lieder, Minneapolis, Minn., assignors to Bemis Company Inc., Minneapolis, Minn., a corporation of Missouri
Filed Aug. 16, 1965, Ser. No. 479,993
U.S. Cl. 53—76                      39 Claims
Int. Cl. B65b 57/18, 7/04; B67b 3/26

ABSTRACT OF THE DISCLOSURE

Apparatus that longitudinally conveys a bag of product between a pair of table tops and thence automatically operates a feeler arm to sense the level of product and adjusts the level of the table tops. Next a pair of opening members force the bag side walls outwardly over the table and entry and exit shoes fold the front and side walls. Rollers form creased side wall tabs; and thereafter as the bag is conveyed, a first gun applies longitudinally spaced adhesive spots on one tab and a reciprocate second gun applies to the other tab an adhesive strip that extends diagonally outwardly, next longitudinally and then diagonally inwardly. Thereafter, the tabs are moved through folder blades to provide a sealed bag closure.

---

This invention relates to new and novel apparatus for automatically closing baler bags, including forming a top portion of a filled bag, applying adhesive, and sealing the bag to form a bag top closure. More particularly, this invention relates to apparatus that will automatically adjust for differences in heights in a series of filled bags, next fold and roll the upper portion of the bag to form folded creased bag top tabs, thence apply adhesive to the formed bag top tabs, and subsequently form a sealed bag top closure.

In filling bags with product, whether the product be in the nature of flowable material without any outside container, or the plurality of filled containers baled in the bag, there is frequently a slight variance in height of the product within the bag from one bag to another. Accordingly, with prior art apparatus for forming a bag top closure, tight closures are not obtained for a series of filled bags. In order to overcome problems of the aforementioned nature and other problems, this invention has been made.

One of the objects of this invention is to provide new and novel apparatus to automatically adjust for variations in product height in a bag of a series of bags and thence form a bag top closure including applying adhesive to form a sealed bag top closure. Another object of this invention is to provide new and novel apparatus to fold and roll the top portion of a bag that will produce tight, well folded and creased tabs, and subsequently applying adhesive to the formed tabs and folding the formed tabs to provide a bag top closure.

Another object of this invention is to provide new and novel apparatus for folding opposite wall portions of a bag filled with product while at the same time providing opposed, outwardly extending tabs and thence crease said tabs. An additional object of this invention is to provide new and novel apparatus that will automatically adjust for variations in the height of product in a series of bags and thence form the bag top such that upon applying adhesive and folding the formed bag top, a bag top closure is provided that forms a tight fit with the product in the bag.

A further object of the invention is to provide new and novel, vertically adjustable bag top forming and creasing apparatus usable in conjunction with a conveyor to form a bag top closure for a baler type bag. Another object of this invention is to provide new and novel apparatus usable with a conveyor for automatically stopping a conveyor and while the conveyor is stopped, vertically adjusting bag top creasing, bag top forming, bag top sealing and bag top folding assemblies for the height of the product in the bag, and after the bag top has been formed and creased, applying adhesive and subsequently folding the formed bag top to provide a bag top closure as the bag is being conveyed.

An additional object of this invention is to provide new and novel apparatus for creasing a bag top to form creased tabs in order to obtain consistently tight folds. An additional object of this invention is to provide new and novel apparatus threadedly adjustable for changes in baler bag sizes.

Still another object of this invention is to provide new and novel apparatus for applying adhesive to a formed bag top. A further object of this invention is to provide new and novel spray pattern of adhesive on outwardly extending bag tabs.

Other and further objects are those inherent in the invention herein illustrated, described, and claimed, and will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the invention may be employed.

The invention is illustrated in the drawings in which corresponding numerals refer to the same parts and which:

FIGURE 1 is a right side elevational view of the apparatus of this invention in a datum condition, portions of the main frame being broken away to more clearly illustrate certain structural features;

FIGURE 2 is a back end vertical elevational view of the apparatus of FIGURE 1, a portion of the control panel box being broken away;

FIGURE 3 is an enlarged front view of the entry folder assembly in a datum condition, said view being generally taken along the line and in the direction of the arrows 3—3 of FIGURE 1;

FIGURE 4 is a still further enlarged fragmentary perspective view looking upwardly and rearwardly toward the right side with the feeler arm measuring the height of product in a baler bag and the entry folder and creasing assemblies in a datum condition;

FIGURE 5 is an enlarged fragmentary, front isometric view showing the relative positions of the entry folder and exit folder assemblies, and the creasing assembly after the bag top has been formed and creased to provide transversely outwardly extending tabs;

FIGURE 8 is a vertical cross sectional view generally taken along the line and in the direction of arrows 8—8 of FIGURE 2 to show the drive from the reducer shaft to the bottom conveyor and a portion of the drive connections for the side conveyors;

FIGURE 9 is a somewhat diagrammatic, transverse cross sectional view generally taken along the line and in the direction of the arrows 9—9 of FIGURE 1 to show the feeler arm assembly in a product height measuring condition, portions of the view being broken away;

FIGURE 10 is a fragmentary side view generally taken along the line and in the direction of the arrows 10—10 of FIGURE 9 other than the feeler arm assembly is in a datum condition, a central portion of the structure of this view being broken away;

FIGURE 11 is a fragmentary left side view of the structure mounting the creasing rollers for both vertical movement and pivotal movement, and the structure for releasably retaining the creasing roller mounting plate in the datum condition, said view being generally taken along the line and in the direction of the arrows 11—11 of FIGURE 13;

FIGURE 12 is a horizontal cross sectional view looking upwardly at the exit folder assembly in a datum condition, said view being generally taken along the line and in the direction of the arrows 12—12 of FIGURE 1 with portions of said assembly being broken away;

Figure 6:
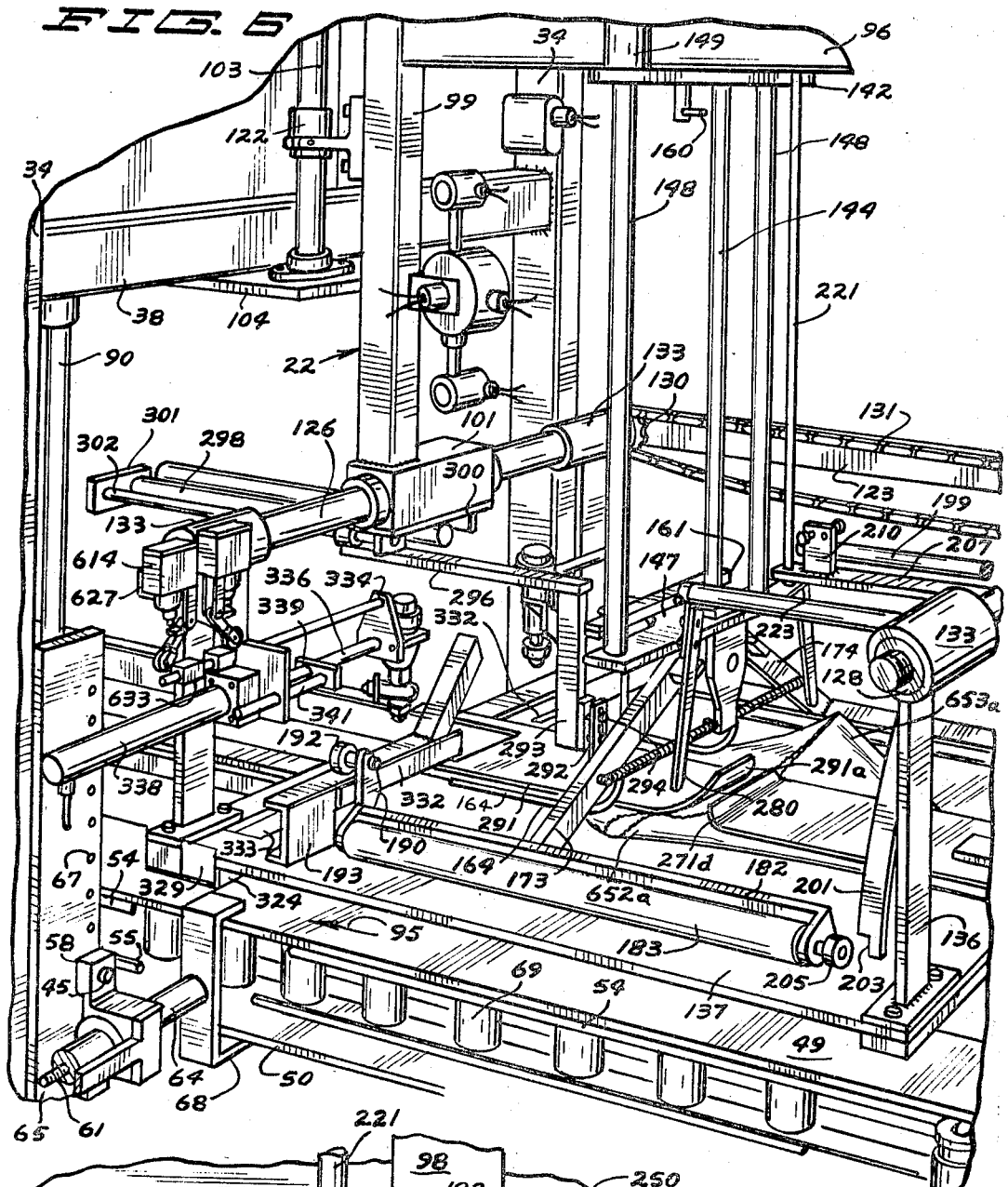
FIGURE 6 is an enlarged perspective view showing the entry folder, the exit folder, and the creasing assemblies in the same relative positions as shown in FIGURE 5, and additionally, showing the adhesive applicator assembly, said view looking downwardly and toward the right rear corner of the apparatus of this invention.
Figure 13:
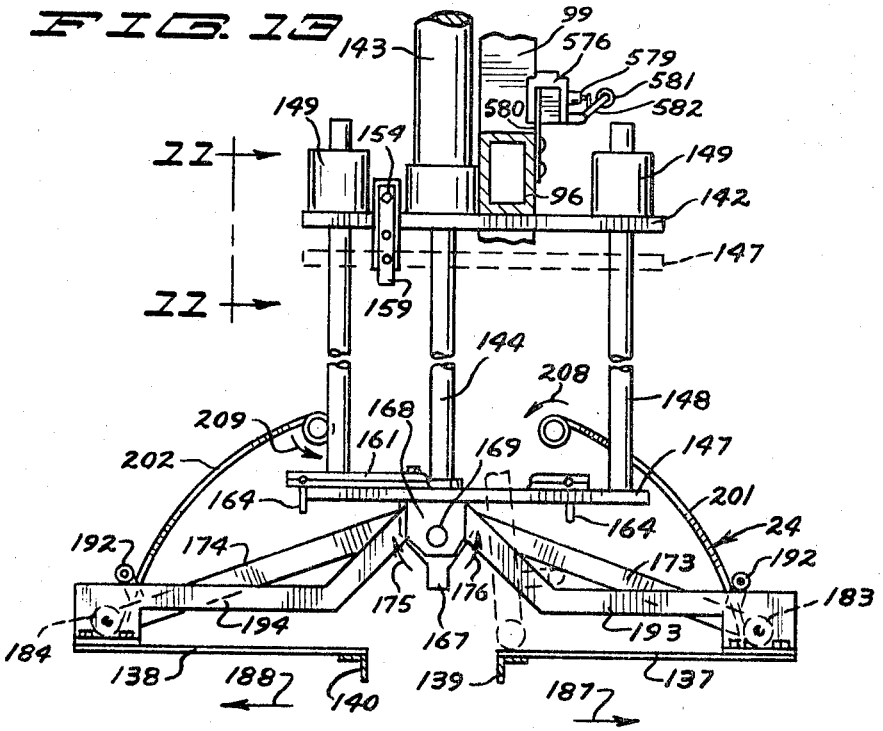
Figure 14:
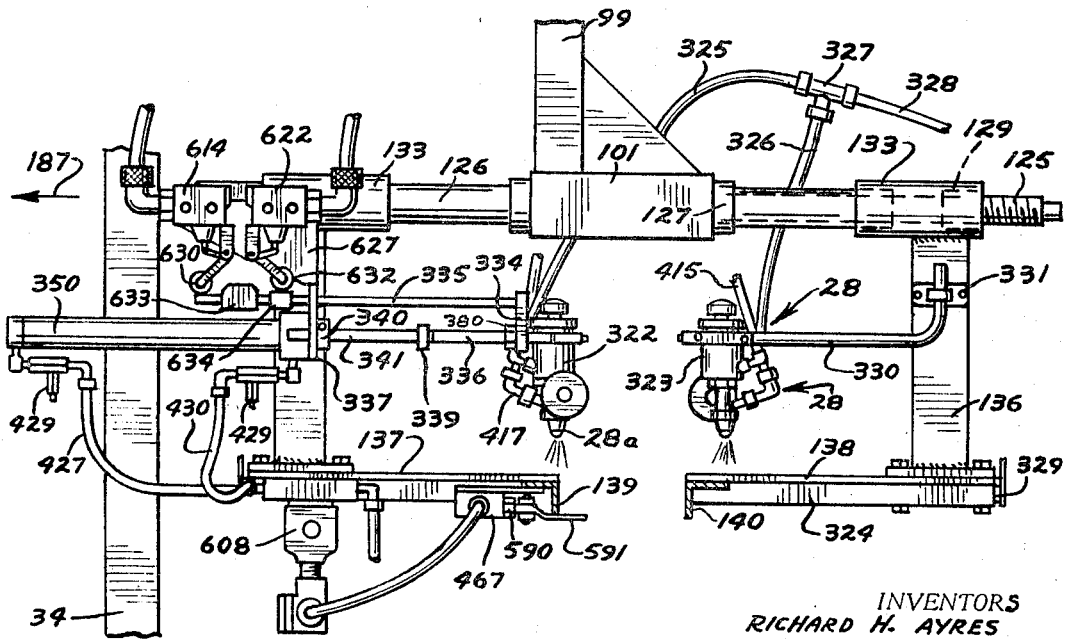
Figure 15:
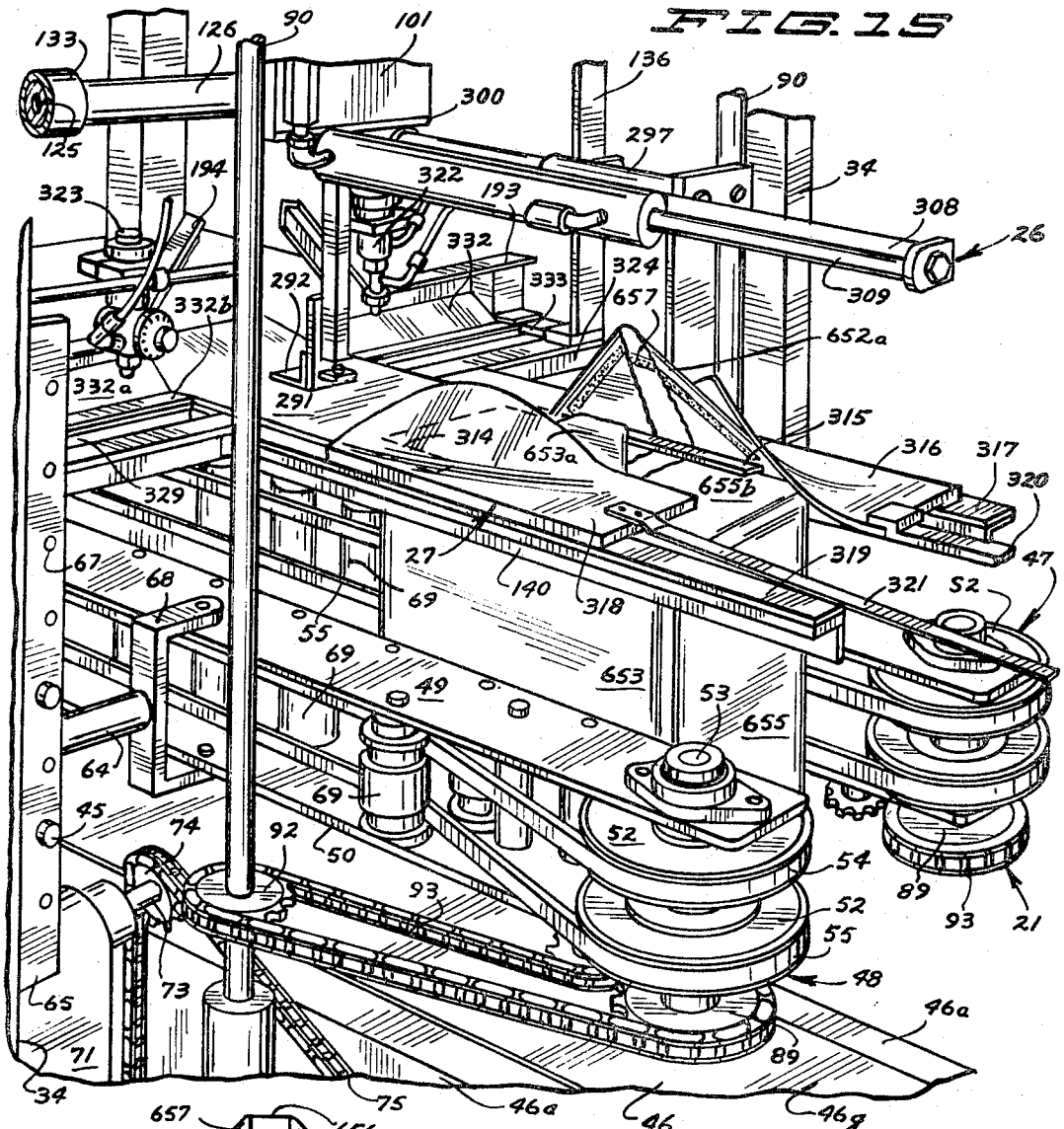
Figure 16:
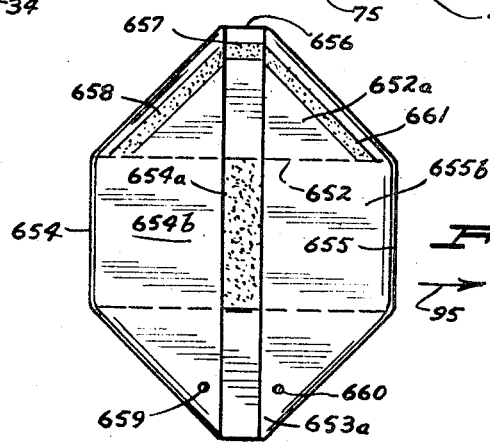

FIGURE 13 is a vertical cross sectional view of the bag top creasing assembly generally taken along the line and in the direction of the arrows 13—13 of FIGURE 1 with the central portion broken away, said view in solid lines showing said assembly in the positions of FIGURES 5 and 6, and in dotted lines illustrating the position of creasing arm mounting plate in a datum position and a creaser arm after it has been lowered sufficiently that a creasing roller initially engages a folding table;

FIGURE 14 is a fragmentary vertical cross sectional view of the adhesive applying assembly at the time it initially starts applying adhesive, said view being generally taken along the line and in the direction of the arrows 14—14 of FIGURE 1;

FIGURE 15 is an enlarged perspective view showing the structure at the rear portion of the apparatus of this invention adjacent the folder blades at a time the tabs are being folded to complete the formation of the bag top closure, said view looking forwardly toward the left side of said apparatus;

FIGURE 16 is a plan view of a bag that has had its top tabs formed in accordance with this invention and showing the pattern of adhesive applied thereto; and FIGURE 17 is a schematic, pneumatic and electric circuit diagram showing certain of the related mechanical components, said view generally showing the electrical circuitry in solid lines and the pneumatic circuitry in dotted lines other than the internal fluid connections of the air valves in one condition are shown in solid lines and in a second condition in dotted lines.

Referring now in particular to FIGURES 1 and 2, the apparatus of this invention includes a main frame 20, a conveyor assembly 21 mounted on the main frame, an adjustable frame assembly 22 mounted on the main frame, a feeler arm assembly 23, a creasing assembly 24, an entry folder assembly 25, an exit folder assembly 26, a final folder assembly 27, an adhesive applying assembly 28, and pneumatic and electrical control circuitry 29, each of the aforegoing being generally designated. As will be more fully noted hereinafter, each of the assemblies 23–28 inclusive is mounted on the adjustment frame assembly for movement therewith and also movable relative thereto.

The main frame 20 includes a pair of transversely spaced front uprights 32 and 33, a pair of transversely spaced rear uprights 34, a pair of longitudinal top braces 35 respectively joining uprights 33, 34 and uprights 32, 34, a pair of longitudinal bottom channels 36 respectively joining uprights 32 and 34 and uprights 33 and 34, and a pair each of transverse top channels 37, intermediate channels 38 and bottom channels 39 respectively extending between front channels 32, 33 and rear channels 34, 34. As may be noted from the drawings, frame members 32–39 are joined together to form an open box type frame.

The main frame also includes a vertical channel 42 having its lower end secured to the mid-portion of front top channel 37, a rear vertical channel 43 having its lower end secured to the mid-portion of rear top channel 37, and a horizontal reinforcing plate 44 having one end attached to the upper end of channel 42 and its opposite end attached to the upper end of channel 43.

Referring in particular to FIGURES 1, 2, 6, 8, and 15, the conveyor assembly 21 of this invention includes a bottom conveyor 46 mounted on the bottom transverse channels 39 intermediate the left side uprights 32, 34 and the right side uprights 33, 34. The bottom conveyor is of a length to extend a substantial horizontal distance forwardly of the front uprights and a substantial distance rearwardly of the rear uprights. Conveyor 46 includes side plates 46a that mount the front idler roller 46b, a rear idler roller 46c, longitudinally spaced tensioning rollers 46d, 46e, and a drive roller 46f. The aforementioned rollers are mounted such that the upper run of 46g of the conveyor belt extends from roller 46b rearwardly to roller 46c, thence downwardly and forwardly along a run 46h to pass partially around roller 46e, thence rearwardly along length 46m to loop around the drive roller 46f, next forwardly along 46n to tensioning roller 46d and finally along run 46p to the forward roller 46b.

The conveyor assembly 21 also includes a left side conveyor sub-assembly 47 and a right side conveyor sub-assembly 48 that each have a top mounting plate 49, a bottom horizontal mounting plate 50, a pair of vertically spaced front idler sheaves 51, a pair of vertically spaced rear drives sheaves 52, an upper horizontal belt 54, a lower horizontally extending belt 55, and a plurality of longitundially spaced rollers 69 between plates 49 and 59. Each pair of the drive sheave 52 for each of the side conveyor sub-assemblies is mounted on a vertical drive shaft 53 while rollers (some grooved) 69 for each sub-assembly bear agaiint the inner runs of the belts 53, 54 to hold said runs in abutting engagement with a bag that is between sub-assemblies 47, 48.

Since each of the conveyors 47, 48 is mounted on the uprights 33, 34 and 32, 34 respectively for independent translatable movement relative one another between more closely adjacent positions and spread apart positions in generally the same manner as disclosed in U.S. 3,167,897, granted Feb. 2, 1965, the mounting of the side conveyor sub-assemblies will not be further described other than to indicate that there is provided for each sub-assembly 47, 48, a front retainer 56 rotatably mounting a shaft 57, a rear retainer 58 rotatably mounting a shaft 61 having a crank 59, each of shafts 57, 61 being mounted for only rotation and having an externally threaded end portion threaded into an internally threaded sleeve 64 that is welded to a bracket 68 which in turn is pivotally secured to plates 49, 50 and a chain 60 extended over sprockets 70 keyed on shafts 57, 61 whereupon turning the crank in one direction, the side conveyor sub-assembly is translated toward the other side conveyor sub-assembly and turning the crank in the opposite direction, it is translated away from the other side conveyor sub-assembly.

In order to permit selectively vertically adjusting the height of the side conveyors 47 and 48, for each of the side conveyor sub-assemblies there is provided vertically elongated plates 65, 66, plate 66 being welded to the front upright to extend toward the other front upright and the plate 65 being welded to the rear to extend toward the other upright. Each of the plates 65, 66 has a plurality of vertically spaced apertures 67 for receiving the bolts 45 that respectively mount the front and rear retainers 56, 58. Thus by unbolting the retainers from the plates 65, 66 at one side and extending the bolts through, for example, apertures 67 at a higher elevation, the side conveyor sub-assembly may be remounted at a higher elevation than which it was previously mounted.

In order to drive conveyors 46, 47 and 48, there is provided a motor-reducer 71 that is mounted on a plate 72. Plate 72 in turn is mounted by the rear transverse channel 39 and the right hand longitudinal channel 36, plate 72 having a cut-out at the corner adjacent the right upright 34.

The reducer has a driven shaft 73 that has a sprocket 74 keyed thereto. A drive chain 75 is extended partially around sprocket 74, next partially around bottom conveyor belt drive sprocket 76, thence over the tensioning sprocket 77, next partially around side conveyor belt drive sprocket 78 and back to sprocket 74. Sprocket 76 is keyed to a shaft 79 which is journaled for rotation in a mount 80 dependingly secured to plate 72 and mounts (not shown) dependingly secured to conveyor plates 46a. Drive roller 46f is keyed to shaft 79 to be driven thereby.

Side conveyor drive sprocket 78 is keyed to one end of a horizontal shaft 84 which, through a suitable drive connection 86, drives horizontal shaft 81. Shaft 81 through drive connection 87 drives shaft 85. Shafts 84, 85 constitute portions of conventional angle gear boxes 82 and 83 respectively. Angle gear box 82 is mounted on plate 72 while angle gear box 83 is bolted to a plate 88 that in turn is bolted to the rear transverse channel 39 at a location adjacent the left upright 34.

Each of the angle gear boxes contains suitable gears (not shown) for transmitting the drive of shafts 84, 85 respectively to a vertical shaft 90 that has its lower end journaled for rotation by the respective gear box. The upper end of each shaft 90 is rotatably mounted by a mount 91 that is dependingly secured to the rear transverse channel 38 (also see FIGURE 5).

Keyed to each of the shafts 90 is a sprocket 92 that drives a chain 93 extended around the adjacent sprocket 89 that is keyed to the respective shaft 53. Due to the internal gearing in boxes 82, 83 the right hand shaft 90 is driven in opposite direction of rotation from the left hand shaft 90 and accordingly the inner runs of the belts 54, 55 for each of the side conveyor sub-assemblies 47, 48 are driven in the same direction (direction of the arrow 95). Likewise, the upper run 46g of the bottom conveyor belt is driven in the same direction through drive connections from the reducer to the drive roller 46f.

In order to facilitate the description of portions of the apparatus of this invention, it will be assumed that it has a central longitudinal axis lying in the longitudinal plane L—L which passes lengthwise through conveyor 46. Transversely inwardly will refer to a location more closely adjacent the longitudinal plane or axis L—L than the part previously referred, and conversely transversely outwardly a greater distance from said plane or axis.

Referring in particular to FIGURES 1, 5 and 6, the adjustment frame 22 includes a top longitudinal brace 97 that is of a substantially smaller length than the spacing between channels 42 and 43. One end of brace 97 is welded to the upper end of vertical frame member 98 while the opposite is welded to vertical frame member 99. A second horizontal brace 96 likewise has its opposite ends welded to frame members 98, 99 but at a substantially lower elevation than longitudinal brace 97. To the lower end of frame member 98 there is dependingly mounted a transversely elongated mounting block 100 while a corresponding block 101 is dependingly welded to frame member 99.

To mount the adjustment frame for movement between limited vertical positions, the elevating and mounting assembly 30 includes a first adjusting screw 102 and a second adjusting screw 103. The upper end portions of each of the adjusting screws is threaded while the lower ends thereof are not threaded. The upper end of adjusting screw 102 is journaled for rotation in a mount 105 which is bolted to longitudinal brace 44 while the lower end is journaled for rotation in a mount 104 secured to the front channel 37, mounts 104, 105 being located such that the adjusting screw 102 is adjacent and extends parallel to channel 42. The lower end of adjusting screw 103 is journaled for rotation in a mount 104 that is secured to the central portion of rear channel 38 and has a stud end portion 106 that extends upwardly through a mount 107 that is bolted to brace 44 (see FIGURE 2). A sprocket 108 keyed to screw 102 to be driven by a chain 109 which in turn is driven by a sprocket (not shown) keyed to stud 106. A tensioning sprocket 115 is mounted on brace 44 to depend therefrom in engagement with chain 109. In order to drive the sprocket on stud 106, a sheave 114 is keyed to said stud to be driven by a belt 110 which in turn is driven by a sheave 111 mounted on the motor shaft of motor 112. A motor mount 113 attaches the motor to the channel 43 such that motor shaft is parallel to screws 102, 103.

As may be noted from FIGURE 1, the adjustment frame is located horizontally between adjusting screws 102, 103. An adjusting nut 119 is bolted to the upper end of frame member 98 while a second adjusting nut is bolted to the upper end of frame member 99. Adjusting nuts 119 have internal threads to form a matching fit with the threaded portions of adjusting screws 102, 103 whereby upon turning the screws in the same direction, the adjusting nuts will be vertically moved to thereby move frame 22 in the same direction. On the lower non-threaded end portion of adjusting screw 103 there is provided a guide 122, that is bolted to frame member 99 (see FIGURES 1 and 6). The guide 122 forms a sliding fit with adjusting screw 103 and serve to act in conjunction with the adjusting nuts to preclude horizontal or pivotal movement of the adjusting frame.

By the aforementioned structure, the adjustment frame is mounted for vertical movement and has the lower ends of frame members 98, 99 located a substantial vertical distance beneath the adjusting screws and the longitudinal channels 35. Further, the adjustment frame is located transversely intermediate channels 35.

The creasing assembly 24 includes a transverse sleeve 126 extended through block 100 and a second transverse sleeve extended through block 101, each sleeve having a collar 127 keyed thereto on each side of the respective block to abut thereagainst (see FIGURES 2–6 and 14). The front sleeve mounts the central non-threaded portion of shaft 124 for only rotary movement while the rear sleeve similarly mounts a shaft 125, each shaft having opposite, threaded end portions extending outwardly of the sleeve. On each of the sleeves right hand threaded end portions there is provided an internally threaded adjustment nut 129 (see FIGURES 5 and 14) having threads that form a matching fit with the thread on said right hand end portion, while on the left hand threaded end portion of each shaft there is correspondingly provided an adjustment nut 128 (see FIGURE 6). In this connection the left side shaft threads are pitched in the opposite direction from those on the right hand side. On each adjustment nut 128, 129 there is keyed a tube 133 that extends transversely inwardly toward the respective block 100, 101 to at least in part abuttingly surround the adjacent end portion of sleeve 126.

In order to simultaneously rotate shafts 124, 125 in the same direction, a sprocket 130 is keyed to one end of shaft 125 and driven by a chain 131 that is extended around sprocket 130 and a sprocket 132 that is keyed to shaft 124. The outermost end of shaft 124 has a crank 134 keyed thereto for rotating shaft 124 and thereby shaft 125. By turning crank in the appropriate direction, the adjustment nuts 128, 129 and the structure mounted for movement therewith may be translated to either a more transversely spread apart position, or a more closely adjacent position. The importance of this feature will become more apparent hereinafter.

To each of the tubes 133 there is welded the upper end of a vertical plate 136, the plates 136 at the left side of the machine having their lower ends bolted to opposite longitudinal corner portions of a folding table 137. Likewise, the lower end portions of the plates 136 at the right side of the machine have their lower ends bolted to a folding table 138. As may be noted in particular from FIGURE 5, the folding tables 137, 138 have generally horizontal planar top surfaces located in a common plane and extend transversely inwardly toward one another to have inner vertical edges substantially spaced. Further, as may be noted from FIGURE 6 the folding tables are located vertically above the upper plates 49 of the side conveyor assemblies while their adjacent inner edges are located vertically above the respective inner runs of belts 54, 55. To the edge portion of table 137 that is adjacent table 138, there is dependingly bolted an angle iron 139 having a vertical surface coextensive with the adjacent edge of table 137, while an oppositely faced angle iron 140 is likewise bolted on table 138 (see FIGURES 4 and 5). The angle irons extend a substantial distance longitudinally rearwardly of the tables (see FIGURE 15) and at their forward end portions are curved transversely away from one another in a forward direction (as do the adjacent edges of the tables) to provide a throat for receiving an upper end of the bag as the bag is moved in a rearward direction by the conveyor assembly.

In order to form creased bag top tabs on the folding tables, the creasing assembly includes a transversely elongated support plate 142 that is welded to longitudinal frame member 96 to extend transversely either side thereof (see FIGURES 11 and 13). The lower end of the cylinder 143 of a two way acting piston cylinder combination is bolted to plate 142 such that the cylinder extends vertically thereabove, and the piston rod 144 of said combination passes through an aperture in said plate. The upper end of the cylinder is bolted to an upright plate 145 that has its lower end welded to longitudinally intermediate portion of brace 97 (see FIGURE 1).

The lower end of piston rod 144 mounts a horizontally extending T-shaped plate 147 for movement therewith, plate 147 extending transversely outwardly of either side of the piston rod and having a leg extending rearwardly thereof (see FIGURE 6). To opposite transverse end portions of plate 147 and on either side of brace 96, there is secured a lower end of a guide rod 148 which slidably extends upwardly through plate 142 and a respective tubular guide 149 that is welded to plate 142. Through the provision of the piston cylinder combination 143, 144, plate 147 is translatable from its lowermost position illustrated in solid lines in FIGURE 13 to its uppermost dotted line position of the same figure, while the guide rods 148 and guides 149 prevent tilting movement of the plate 147 as it is translated between its uppermost and lowermost positions.

In order to releasably retain plate 147 at its uppermost position when no air under pressure is being applied to the cylinder 143, a piston cylinder combination having a cylinder 153 is mounted on plate 142 intermediate the right guide 149 and cylinder 143 (see FIGURE 11). The last mentioned piston cylinder combination also includes a piston rod 154 that at its outer end mounts a depending bar 155 (also see FIGURE 13), there being a nut 156 threaded on piston rod 154 on either longitudinal side of bar 155. Bar 155 at its intermediate portion mounts one end of a horizontal guide rod 157 which slidably extends through an appropriate guide aperture provided in the lower end of plate 158. Vertically above guide rod 157, plate 158 is bolted to plate 142, the upper end of plate 158 being attached to the rearward end portion of cylinder 153.

With the piston rod 143 in its outermost position, plate 158 mounts a horizontal stud 160 at about the same elevation as plate 147 but to one side of the rearwardly extending leg 147a of said plate. The rearwardly extending leg mounts a transversely elongated mounting member 161 to extend transversely outwardly of either side of said leg, stud 160 being at a slightly lower elevation than mounting member 161 whereby upon retraction of the piston rod 154 from its extended position of FIGURE 11 by a spring (not shown) in cylinder 153, stud 160 will underly mounting member 161 in the piston rod retracted position of piston rod 154. Accordingly with piston rod 154 in a retracted position and stud 160 underlying member 161, upon no air under pressure being applied to cylinder 143, plate 147 can only move slightly downwardly in vertical direction until mounting member 161 bears against stud 160.

Each transverse outer end of mounting member 161 provides a split clamp for clampingly retaining one leg of the generally U-shaped tab hold-down rod 164. Each rod 164 extends forwardly of mounting member 161, thence vertically downwardly and subsequently horizontally rearwardly such as may more readily be seen from FIGURES 1 and 6.

One longitudinal end portion of T-plate 147 dependingly mounts a mounting plate 167 while the opposite end portion dependingly mounts a mounting plate 168, plates 167, 168 in turn mounting the longitudinally extending short pivot shaft 169. Pivot shaft 169 in turn extends through the legs of a U-shaped left arm mounting bracket 170 and the legs of a U-shaped right arm mounting bracket 171. As may be noted from FIGURE 11, shaft 169 mounts brackets 170 and 171 longitudinally offset from one another. Bracket 170 in turn mounts the upper end of a creaser roller arm 173 while bracket 171 mounts the upper end of a creaser roller arm 174 such that arms 173, 174 are located in a common transverse vertical plane.

The brackets 170, 171 also mount arms 173, 174 such that they are pivotable respectively in the direction of the arrows 175, 176 from the position that the adjustment studs 178 abut against the oppositely inclined surfaces 167a of bracket 167 to a spread apart position such as illustrated in FIGURES 5 and 13. To be mentioned is that each of the studs 178 is mounted in a lug 179, one lug being welded to arm 173 and the other to arm 174. The studs are adjustably threaded in the lugs sufficiently that the arms 173, 174 are inclined downwardly a few degrees from a vertical longitudinal plane with the lower end of arm 173 being transversely to the left of said plane and the lower end of arm 174 transversely to the right of said plane.

Referring to FIGURES 5, 6 and 13, the lower end of each of the arms 173, 174 is welded to the web portion of a generally U-shaped bracket 182, each bracket in turn having its legs mounting either a roller 183 or roller 184 for rotation about a horizontal longitudinal axis. That is, the brackets mount the rollers such that as the T-shaped plate 147 is moved from the dotted line position to a solid line position of FIGURE 13, roller 183 initially engages table 137 and roller 184 initially engages table 138, and thence further downward movement of plate 147 results in the rollers respectively moving along the upper table surfaces 137, 138 in the direction of the arrows 187, 188 to the spread apart condition of FIGURES 5 and 13.

Each bracket at one longitudinal end mounts a lug 190 which in turn mounts a cam follower 192, the cam follower associated with roller 183 riding on the cam follower surface of the cam track 193 and the cam follower associated with roller 184 riding on the cam follower surface of cam track 194 (see FIGURES 5, 13 and 15). Cam tracks 193, 194 have transversely outwardly depending portions that are respectively bolted on tables 137, 138 adjacent the rearward end portions thereof, and extend transversely toward the longitudinal axis of the unit. As may be noted from FIGURE 13, each of the cam tracks has a generally horizontally extending portion and thence at the inner transverse edge of the respective table is inclined upwardly in a direction toward the other table. The inclined portion of the cam tracks extend more closely adjacent one another than the adjacent edges of the tables 137, 138 whereby if the roller arms are not sufficiently downwardly, divergingly inclined, the cam followers 192 will initially engage the inclined cam track surface portions prior to the time the rollers engage the table surface to preclude arms 173, 174 being pivoted in the direction opposite arrows 175, 176 respectively after the rollers 183, 184 have been brought into initial contact with the table surfaces and to initiate the movement of the rollers transversely outwardly as they are moved downwardly.

In order to insure that the rollers 183, 184 exert pressing forces against respective tables (or through bag tabs) as they are moved from the dotted line position of FIGURE 13 to solid line position thereof, a first coil spring 196 has its one end connected to the mid-portion of arm 173 and its opposite end to mounting plate 167 while a second coil spring 196 has its one end connected to the mid-portion of arm 174 and its opposite end to mounting plate 167 (see in particular FIGURE 5). These coil springs resiliently urge the arms to pivot about shaft 169 to a position that stud bolts 178 abut against mounting plate 167.

Figure 7:
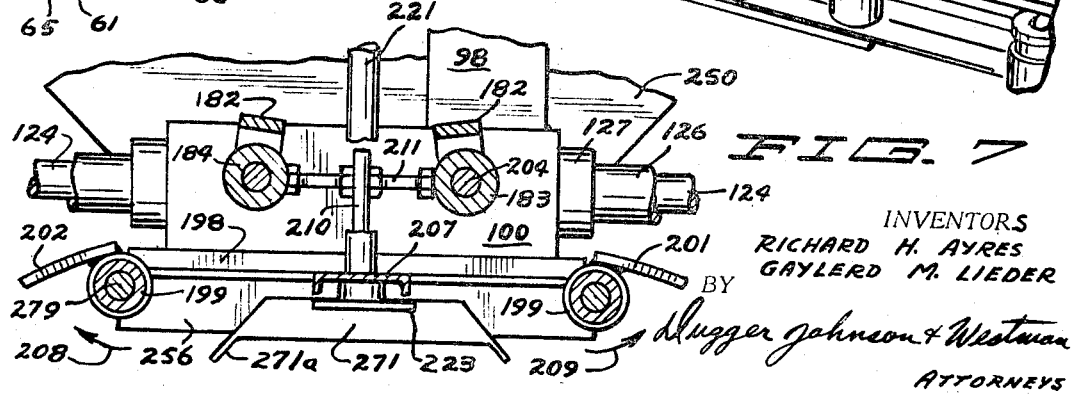
FIGURE 7 is a still further enlarged, fragmentary vertical cross sectional view generally taken along the line and in the direction of the arrows 7—7 of FIGURE 1 to show the mounting of the creasing roller return cam tracks, and the creasing rollers in a datum condition.

In order to provide for a different return path of movement of the rollers from their spread apart condition of FIGURE 5, to a datum position in part indicated by FIGURE 7, a transversely extending horizontal plate 198 is dependably welded to block 100, a longitudinally extending tube 199 being welded to either transverse edge portion of plate 198. A trip cam track 201 has its annular end portion pivotally mounted on a portion of tube 199 that extends rearwardly of block 100 in overhanging relationship to table 137, and in a datum condition is arcuately curved transversely and downwardly to the left to have its lower edge abut against table 137. Likewise, a second trip cam track 202 has its annular portion pivotally mounted on the other tube 199 and is arcuated curved to extend transversely to the right and downwardly to have its lower end abut against table 138 (see FIGURE 5). Each of the tracks at its lower end has a cutout 203 (see FIGURES 4 and 6).

Each of the rollers 183, 184 has a roller shaft 204 extended through the legs of the respective bracket 182 with one end portion extending forwardly of the respective bracket to have a cam follower roller 205 mounted thereon. The rollers 205 are mounted at an elevation and the cutouts 203 are of a size that when the creasing rollers move from a dotted line position initially engaging table surface (see FIGURE 13) toward a spread apart position of FIGURE 5, the cam follower rollers 205 initially engage the trip cam tracks 201, 202 to respectively cause them to pivot a limited amount in the direction of the arrows 209, 208 about tubes 199 and thence pass through the cutouts 203 whereupon the tracks under gravity will pivot to have their lower edges again abut against the tables. However, when the T-plate 147 is elevated from the creasing roller spread apart condition, springs 196 draw creasing arms 173, 174 toward one another and the creasing rollers roll across the table tops. Upon the creasing rollers being moved transversely toward one another, the cam followers 205 will abut against the respective trip cam track just above the cutouts 203 and thence as T-plate 147 is further elevated, due to springs 196, the creasing rollers move through paths that the cam followers 205 are retained in engagement with the tracks 201, 202 until the position above tubes 199. In this connection, it is to be noted that due to the trip cam tracks extending outwardly in opposite transverse directions from tubes 199 and having their lower ends abut against the respective table, they cannot pivot in the direction opposite arrows 208, 209 respectively, as the creasing rollers have their cam followers 205 bear thereagainst.

A horizontally rearwardly extending bracket 207 has its forward end welded to plate 198 such that it will extend along the central longitudinal axis of the machine of this invention. The rearward end portion of the bar mounts an upright lug 210 (see FIGURES 6 and 7) which in turn mounts a pair of stud bolts 211 to extend in opposite transverse directions therefrom. Stud bolts 211 are adjustably threaded into lug 210 to have their head portions bear against the respective creasing roll at the time the plate 147 is in its datum position to, in conjunction with studs 178 acting against the creaser arms, retain the creasing rolls in a minimum spaced condition. In this connection, it is to be noted that in a datum condition, the creasing rolls are more closely adjacent one another than the adjacent upper ends of trip cam tracks 201, 202 and at a higher elevation.

In order to automatically ascertain if the top surfaces of the tables 137, 138 are at the same elevation as the level of product in a bag carried by the side and bottom conveyors, there is provided the feeler arm assembly 23 which includes a two way acting piston cylinder combination having a cylinder 215 mounted on vertically elongated plate 216 (see FIGURES 1, 9 and 10). Plate 216 at its lower end is welded to the mid portion longitudinal brace 96 and is attached to longitudinal brace 97 to extend thereabove, the lower end of cylinder 215 being located at about the elevation of brace 97. The last mentioned piston cylinder combination also includes a piston rod 217 having its lower end freely slidably extended through a horizontal ear 218a of a switch operating member 218. Jam nuts 219 are threaded on the lower end of piston rod 217 to limit the lower elevation of ear 218a relative the piston rod while at the same time permitting the piston rod moving downwardly relative ear 218a.

Switch operating member 218 is keyed to an intermediate portion of the vertically elongated feeler rod 221 that extends parallel to and is rearwardly spaced from piston rod 217. The upper end portion of rod 221 is slidably extended through a moutning bracket 222 that is secured to plate 216 and a lower end portion slidably depends through an aperture provided in bar 207 rearward of lug 210 (see FIGURE 6). A generally horizontal elongated foot 223 is fixedly secured to the lower end of rod 221.

When the piston rod 217 is in the retracted position of FIGURE 10, due to nuts 219 abutting against ear 218a, the feeler foot is retained in an elevated position immediately beneath bar 207 as shown in FIGURES 6 and 7. However, when the piston rod is in the extended position of FIGURE 9, the feeler rod is free to move a substantial distance downwardly as shown in FIGURE 4 and as will be described hereinafter. In the piston rod extended position, a jam nut engages the movable switch member 225 of the feeler rod switch 226. Switch 226 is bolted to the lower end of the vertical transverse plate 227 which in turn is welded to plate 216 to depend therebetween.

On the longitudinally opposite side of the feeler rod from plate 227, a transversely elongated switch mounting plate 232 is welded to plate 216 to extend on opposite transverse sides thereof. A down switch 233 is bolted to one transverse end portion of plate 232 such that its switch operating roller 234 is located at about the same elevation as switch member 225. Roller 234 is pivotally mounted on switch operating linkage 235 such that when a downward force is exerted on roller 234, the linkage 235 will move the resiliently urged switch member 236 against the action of the coil spring (not shown) as will be more fully described hereinafter. Up switch 240 is bolted to the opposite transverse side of plate 232 and is located opposite rod 221 from switch 233. Plate 216 has a cutout 216a such that the switch operating linkage 235 of switch 240 which mounts roller 241 is on the transverse opposite side of the feeler rod from roller 234. Switch 240 also includes movable switch member 242 and is operated through movement of roller 241.

As may be in part noted from FIGURE 9, switch operating member 218 has a first switch operating surface 218b that is inclined downwardly toward the right transverse side of the machine and an oppositely inclined switch surface 218c. Switches 233, 240 are mounted such that when the feeler arm 221 moves downwardly the weight of the feeler arm acting through switch operating member 218 will first bring surface 218b into abutting contact with roller 241 to through linkage 235 move push button 242 and at a slightly lower elevation, bring surface 218c into abutting contact with roller 234 to actuate switch member 236 (assuming the downward movement of the feeler rod has not been limited by the feeler foot engaging the product as will subsequently be described). Thus, if inclined surfaces 218b, 218c are of the same size and shape, and at the same elevation other than being oppositely inclined, and rollers 234 and 241 are of the same diameter, then the respective switches are mounted so that roller 234 is at a somewhat lower elevation than roller 241. However, the retraction of piston rod 217 from its extended position of FIGURE 9 will move the switch operating member 218 a substantial distance upwardly above rollers 234, 241 and accordingly through nut 219 moving into engagement with ear 218a will move the feeler rod upwardly to the position illustrated in FIGURE 10 whereby the feeler foot is adjacent bar 207 as shown in FIGURE 6. Through the provision of switches 233, 240, the actuation and direction of rotation of motor 112 is controlled, and thereby the elevation of the tables 137, 138 as will be more fully explained hereinafter.

Referring now in particular to FIGURES 1 and 3–5 inclusive, the entry folder assembly 25 will now be described. Assembly 25 includes a transversely extending vertical plane 250 having a lower edge portion welded to block 100 and an upwardly opening generally V-shaped notch 250a. A pair of transversely spaced mounts 251 are bolted to plate 250 for rotatably mounting a transverse shaft 252 forwardly of plate 250 and at a substantially higher elevation than block 100. On either transverse end of shaft 250 there is keyed one end of a folder pivot arm 253. Each of the opposite ends of the arms 253 is pivotally connected at 255 to the adjacent leg of a generally U-shaped bracket 256. To the outer end portion of each of the bracket legs there is pivotally connected one end of a parallel rod 257 by a pivot member 258. The opposite ends of each of the parallel rods is pivotally connected at 259 to the forward end portion of a longitudinally extending plate 260, there being provided one plate 260 at either end of shaft 252. Each of the plates 260 has its opposite end welded to plate 250. To be noted is that there is sufficient play between pivot members 259 and rods 257, and pivot members 258 and rods 257 such that even though rods 257 are slightly transversely inclined relative arms 253, there is no interference with the pivotal swingable movement of the frame 256 from the position of FIGURES 1 and 3 to the position of FIGURE 5; but through the connection of arms 253 and rods 257 to bracket 256, as said bracket is moved between the two aforementioned positions, it is still retained in a generally horizontally extending condition.

In order to pivot the shaft 252 and thereby arms 253 and bracket 256 between the last two mentioned positions, the central annular portion of a crank arm 264 is keyed to shaft 252, the outer end of a radially extending arm 264a of said crank arm that extends rearwardly through notch 250a being pivotally connected at 265 to the lower end of piston rod 266 of a two way piston cylinder combination that also includes a cylinder 267. The upper end of cylinder 267 is pivotally connected at 268 to a mount 269 which in turn is secured to intermediate portion of frame member 98. When the piston rod is in its extended position of FIGURE 1, the bracket 256 is in its upper datum position.

To the web portion of bracket 256 there is secured a rearwardly extending shoe mounting bracket 270, bracket 270 in turn having a forward end portion of a generally horizontally extending entry folder shoe 271 bolted thereto at 272. As may more particularly be noted from FIGURE 4, shoe 271 has a generally horizontal planar portion 271c, a left hand edge portion 271b that is inclined slightly downwardly and transversely outwardly of portion 271c and an opposite inclined edge portion 271a that is inclined downwardly and transversely outwardly of the opposite transverse edge of portion 271c. As may be more widely noted from FIGURE 6, shoe 271 also includes longitudinal rearwardly, upwardly curved end portion 271d.

The crank arm 264 in being operated to pivot shaft 252, thereby through bracket 256, moves the shoe 271 between the position of FIGURE 4 and the position of FIGURE 7; and through its second radial arm 264b also correspondingly angularly moves transversely extending sleeve 274 which is welded to the outer end of arm 264b and located longitudinally forwardly of plate 250. The sleeve 274 at its opposite ends mounts a ball joint member 275 which in turn pivotally mounts one end of a ball joint stud 276. Each stud 276 at its opposite end mounts a ball joint member 277 that pivotally connects the stud to the outer end of a radial arm 278. Each arm 278 has its inner end keyed to the forward end of a longitudinally extending rod 279, each rod having an intermediate portion rotatably supported by a tube 199.

The rearward end of left hand rod 279 mounts the radially extending nozzle arm 280 while right hand rod 279 mounts a corresponding nozzle arm 281. Nozzle arms (also referred to as bag opening fingers) 280, 281 each mount for movement therewith, a nozzle tube 283, that respectively have discharge nozzles 280a, 281a at their outer ends to discharge air in a somewhat conical flow pattern about a line constituting a radial extension of the arm on which the respective nozzle is mounted. As may be noted from FIGURE 4, in the entry shoe datum condition, nozzle arms 280, 281 extend downwardly and inwardly toward one another and crossed as viewed looking rearwardly. However, as the piston rod 266 is retracted to pivot crank arm 264, sleeve 274 is pivoted about the axis of the shaft 252 in the direction of arrow 283 whereby nozzle arm 280 is pivoted about the central axis of left hand tube 199 in the direction of the arrow 284 and nozzle arm 281 is pivoted about the axis of right hand tube 199 in the direction of the arrow 285 to respectively extend downwardly and transversely outwardly from one another such as indicated in FIGURE 5. Longitudinally, the nozzle arms are located to pivot in transverse planes longitudinally intermediate the feeder rod and the creasing roller arms.

Referring now in particular to FIGURES 1, 6, 12 and 15, the exit folder assembly 26 will now be described. Assembly 26 includes a folder shoe 291 that is generally planar in a horizontal plane other than for its longitudinally forwardly, upwardly curved tongue 291a. The lower end of a bar 292 is welded to the central portion of shoe 291, there being provided a pair of vertically spaced bolts 294 slidably extended through appropriate apertures in the upper end portion of bar 292 and threaded into the lower end of a block and mounting plate 293. A coil spring (not shown) is provided on each of the bolts 294 for resiliently urging bar 292 longitudinally forwardly of plate 293. The upper end of plate 293 is welded to the forward end of a longitudinally extending bar 296, the rearward end of said bar being welded to a guide tube 297 which is located longitudinally rearwardly of block 101. Guide tube 297 is slidably mounted on a longitudinally extending guide rod 298, the forward end of the guide rod being fixedly secured in an annular mount 299 that is dependingly welded to a transversely intermediate portion of plate 300. Plate 300 is dependingly bolted to block 101. The opposite end of rod 298 has one transverse end portion of a block 301 clamped therto, the opposite transverse end portion of said block being clamped to the rearward end of guide rod 302 which extends parallel to rod 298. The forward end portion of guide rod 302 is fixedly retained in a mounting block 303 which is dependingly welded to plate 300. A lug 304 is slidably mounted on intermediate portion of guide rod 302 and has one end portion welded to guide tube 297 to extend radially outwardly therefrom. Accordingly, guide rods 298, 302 mount members 297, 304 so that they can only be reciprocated in a longitudinal direction without pivotal movement about either a horizontal or a vertical axis; and likewise, through members 292–294 and 296 mount the exit folding shoe 291 for longitudinal reciprocal movement.

In order to reciprocate guide tube 397 and the structure movable therewith, including shoe 291, the longitudinally extending leg of an L-bracket 308 is welded to guide tube 297 to extend rearwardly therefrom. The transversely extending leg of bracket 308 is attached to piston rod 309 to move therewith. Piston rod 309 is a part of a two way acting piston cylinder combination that also includes the cylinder 310, the forward end of the cylinder being pivotally connected by a pivot member 311 to a block 312 that is dependingly welded to plate 300. In the piston rod retracted position, shoe 291 is in its forwardmost position of FIGURE 6 to extend longitudinally forwardly of the creasing roller arms, and in a piston rod extended condition is retracted to a position that only the curved tongue 291a is longitudinally forwardly of the cam tracks 193, 194 (FIGURES 1, 12 and 15). Further, shoe 291 is mounted to have its bottom generally horizontal surface located at only slightly higher elevation than the top surfaces of tables 137, 138; and at a lower elevation than the lower edges of shoe portions 271b, 271c.

The exit shoe 291 at either transverse side has longitudinally rearwardly extending extensions 314 and 315 respectively. As will be more apparent hereinafter, the extensions cooperate with other structure to be described in the final folding and sealing operation of the machine.

In order to make the final fold of the bag tabs, there is provided the final folder assembly 27 (see FIGURES 1, 2 and 15). Assembly 27 includes a left hand folder blade 316 mounted on a plate 317 which in turn is bolted to the angle iron 139. A second folder blade 318 is mounted on a plate 319 which in turn is bolted to the angle iron 140. As may be noted in the drawings, folder blade 316 is longitudinally offset in a rearward direction from folder blade 318 while each folder blade extends transversely approximately two-thirds of the transverse dimension of the spacing between the vertical legs of angle irons 139, 140 toward the opposite folder blade (see FIGURE 2). The folder blades are approximately curved to fold the tabs over the folded front and back wall portions of the bag in the manner to be described hereinafter.

The longitudinally forwardmost edge of folder blade 316 is located just rearwardly of the rearward edge of the main body (planar horizontal portion) of the exit plate 291 in its longitudinally rearwardmost position of FIGURE 15, while the adjacent exit plate extension 314 underlies folder blade 318. Likewise, the opposite extension 315 in the exit shoe rearward most position underlies the portion of folder plate 316, and extends further rearwardly than extension 314.

There is provided a pair of elongated spring steel holddown straps 320, 321 bolted respectively to the folder blades 316, 318 to extend rearwardly thereof, to be located transversely between adjacent vertical surfaces of angle brackets 139, 140 and to abut against the sealed bag top closure as the bag is conveyed rearwardly of the folder blades to a compression roller unit (not shown). These strips serve to hold the folded bag top in a closed position.

Referring now in particular to FIGURES 6 and 14, the adhesive applying assembly 28 will now be described. The assembly 28 includes a continuous glue gun 322, and a spot glue gun 323, each glue gun having a downwardly directed discharge nozzle 28a. A glue inlet line 325 is fluidly connected to gun 322 and to a T-joint 327, the T-joint also being connected through line 326 to the glue inlet of gun 323. The joint 327 is also connected by line 328 to a glue pot 329 of FIGURE 17, (the connection not being shown), to extend to a lower elevation than the level of the glue in the pot.

Glue gun 323 is clamped in an adjusted transverse position along the length of the transversely extending horizontal leg of the fixed gun mount 330 such that the glue discharge nozzle is directed downwardly toward the table 138 adjacent to its inner longitudinal edge. Gun mount 330 also has a vertically extending leg that is mounted on the right rear plate 136 by a clamp 331. Through the provision of the gun mount and clamp, the transverse position of the spot glue gun and the height thereof can be adjusted within limits.

The travelling gun 322 is clamped to a mounting bracket 334 which in turn is mounted on one end portion of a guide rod 335 and a piston rod 336 to move therewith. The guide rod 335 and piston rod 336 extend transversely to the left and parallel to one another from bracket 334, and the guide rod and piston rod being slidably extended through a vertical plate 337 which in turn is welded to the left rear plate 136 to extend forwardly thereof.

The piston rod 336 is a part of the piston cylinder combination that also includes a cylinder 338 which is mounted by plate 337 to extend transversely to the left thereof. A second guide rod 341 has one end portion extended through plate 337 and a clamp 340 which is mounted on plate 337 to retain rod 341 in a stationary adjusted position. A longitudinally extending stop plate 339 is clamped to the right end of rod 341 and has the piston rod 336 slidably extended through an aperture therein. A stop nut 380 is provided on the piston rod 336 to abut against bracket 334, stop nut 380 abutting against stop plate 339 to limit the transverse retracting movement of the piston rod to the left. Through the provision of members 334–338, the travelling gun 322 may be reciprocated from the position of FIGURE 14 in a transverse direction to the left until the stop nut 380 abuts against plate 339, the movement of gun 322 being in a vertical transverse plane that also passes through gun 323 and longitudinally between cam tracks 193, 194 and rear plates 136.

Directly below the nozzle of each glue gun and extending nearly the transverse width of the respective table, there is provided a generally rectangular cutout 333. A bracket 324 dependingly attached to each table removably mounts a suitable receptacle 329 beneath each cutout to receive any glue passing through the adjacent cutout 333.

In order that the flaps 652a, 653a are in a generally horizontal condition closely adjacent the table as they are moved over cutouts 333 and beneath the respective glue gun, a flap guide 332 is attached to the adjacent cam tracks 193, 194. Each guide has a vertical portion secured to horizontal portion of the respective track, an intermediate portion 332a inclined downwardly and rearwardly to extend beneath said track horizontal portion, and a horizontal flange 332b closely adjacent the table that has a free transverse edge above the forward edge of the respective table cutout (see FIGURE 15). As may be noted from FIGURE 6, the rearward ends of the lower legs of the tab hold-down rods end adjacent the guide vertical portions, and even though said legs are a slight distance above the tables, the inclined portions 332a will direct the tabs to a generally flat condition as they pass therebeneath.

Referring now to FIGURE 17, the pneumatic electrical circuits and components will now be described. The pneumatic circuit and components include a main line M that at one end is fluidly connected to a source of air under pressure 340 and has junctions 342–347 inclusive provided thereon. Intermediate junctions 342–347 and the air source 340 there is provided a shut-off valve 348. Junction 342 is connected by a line 350 to a first port 352 of a solenoid operated feeler arm air control valve 353. Valve 353 is of a construction that it has a second port 354 continuously connected to an exhaust (not shown), a third port 355, and a fourth port 356. Through a solenoid operated valve member (not shown) in one valve member position, port 355 is fluidly connected to port 354, and port 356 is fluidly connected to port 352; but in a second position the aforementioned fluid connections are broken, and fluid connections are made between ports 352 and 355, and 354 and 356 respectively. Port 356 is fluidly connected to the upper end of the feeler arm cylinder 215 by a line 357, there being provided a flow control valve 358 in the line between port 356 and the cylinder. The opposite end of the cylinder is fluidly connected by line 359 to port 355, there being provided a flow control valve 358' in said line intermediate the cylinder and port 355. There is provided a second solenoid operated air control valve 360 that is of the same construction as valve 353, valve 360 having the first port 361, a second port 362, a third port 363, and a fourth port 364, port 362 being connected to junction 343 by a line 366. The third port is continuously connected to exhaust (not shown) while the fourth port 364 is connected by the line 367 to a junction 368. Junction 368 in turn is connected by a line 369 to a junction 370 which in turn is connected by a line 371 to the lower end of the entry folder air cylinder 267. A flow control valve 372 is provided in line 371 between its connection to cylinder 267 and junction 370. The upper end of cylinder 267 is fluidly connected to a junction 375 by a line 374, there being provided a flow control valve 372 in line 374 between cylinder 267 and junction 375. Junction 375 in turn is connected by a line 376 to junction 377 that is connected by a line 378 to the first port 361 of the valve 360. Valve 360 is of a construction that in the first position through a solenoid operated valve member, internal fluid connections are made between ports 361 and 362, and 363 and 364 respectively; and in a second position, the aforementioned internal fluid connections are broken and respectively there are made fluid connections between ports 361 and 363, and ports 362 and 364.

A time delay valve 383 is fluidly connected across junctions 368, 384, junction 384 being fluidly connected to the rearward end portion of the exit folder cylinder 310 by a line 386. A flow control valve 387 is provided in line 386 intermediate junction 384 and cylinder 319. A line 388 fluidly connects the opposite end of cylinder 310 to junction 377, there being provided a flow control valve in said line.

A line 390 fluidly connects junction 375 to the lower end of the bag top folder air cylinder 143, there being provided a flow control valve 387 intermediate junction 375 and cylinder 143. A time delay valve 392 is fluidly connected between the upper end of cylinder 143 and junction 391, junction 391 in turn being fluidly connected to junction 370 through a flow control valve 393.

A line 396 fluidly connects junction 344 to the end of the cylinder 153 such that the application of air under pressure thereto will move its piston rod 154 to the extended position of FIGURE 11. There is provided a coil spring (not shown) in cylinder 153 for returning the piston and piston rod to a retracted position upon the discontinuance of the application of air under pressure through line 396.

A line 398 fluidly connects junction 345 to the inlet port of an air jet valve 399. Valve 399 has an outlet port fluidly connected through a line 400 through a junction 401 which in turn is fluidly connected to the one end of the air nozzle tubes 283 through lines 402, 403 respectively. Valve 399 is of a construction that it has a movable valve member 404 that is spring urged to a position to block fluid communication between its inlet and outlet ports and thereby block fluid communication between lines 398 and 400. However, the valve member is movable to permit fluid communication between the inlet and outlet port, there being provided a cam followed 405 on said valve member to bear against a cam 406 that is keyed to shaft 252 to rotate therewith. In this connection, it is to be noted that valve member 399 is mounted directly above cam 406 by a mount 407 which in turn is secured to front frame member 98 (see FIGURE 3). Cam 406 is of a shape that in the datum condition of FIGURES 3 and 4, valve member 404 is spring urged to a position to block fluid communication between lines 398 and 400; but upon a few degrees rotation of shaft 252, moves to a position that air under pressure is applied to the upper end of the cylinder 267, the cam forcing the cam follower to move in a direction whereby valve member 404 is moved to a position to permit fluid communication between the lines 398 and 400 until about the time that the air nozzle arms have been almost moved to the maximum spread apart condition of FIGURE 5. During the last few degrees movement of the shaft 252, the cam permits valve member 404 again to be moved to a position that fluid communication is blocked between lines 398 and 400.

Junction 346 is connected by a line 409 to the first port 410 of the solenoid operated valve 411 and the first port 412 of the solenoid operated continuous glue valve 413. Valve 411 has an intermediate port 414 fluidly connected to the air inlet port of gun 323 by a line 415, while valve 413 has a corresponding port 416 connected to the air inlet port of gun 322 by a line 417. Each of the valves 411 and 413 has an exhaust port 418 continuously connected to an exhaust (not shown).

Junction 347 is connected by a line 421 to open to the top interior of the closed glue pot 329 for forcing glue under pressure upwardly through line 328. Junction 347 is also connected by a line 422 to a first port 423 of the solenoid operated valve 424, valve 424 also having a second port 425, a third port 426 and a fourth port 427. Valve 424 is of a contruction that through a solenoid operated valve member (not shown) in a first position, internal fluid connections are respectively made between ports 423 and 425, and ports 426, 427. Valve 424 also has a second position in which the aforementioned internal fluid connections are broken and fluid connections are resepctively made between ports 423, 426 and ports 425, 427.

Port 427 is continuously connected to an exhaust (not shown), while port 426 is connected by a line 428 to one end of the continuous glue cylinder 338, there being provided a flow control valve 429 in line 427. The opposite end of cylinder 338 is connected by a line 430 to port 425, line 430 also including a flow control valve 429.

The pneumatic circuitry having been described, the electrical circuitry will now be set forth. The electrical circuitry includes main lines $L_1$ and $L_2$, main line $L_2$ having junctions 433–439 inclusive thereon.

Main line $L_1$ is connected to a first terminal 444 of the master ON-OFF switch which also includes a second terminal 445 and a movable switch member 446 that in an "on" position electrically connects terminals 445, 444 and in "off" position breaks the aforementioned electrical connection. Terminal 445 is connected by a line 447 to a first terminal 448 of a push button stop switch that also includes a second terminal 449 and a push button 450 that unless depressed, electrically connects terminals 448, 449. Terminal 449 is connected by a line 451 to a junction 452 which in turn is connected by a line 453 to the first terminal 454 of a height adjustment limit switch 457. Switch 457 also includes a second terminal 455 and a movable switch member 456 that normally connects terminals 455, 454 but breaks the aforementioned connection whenever it is attempted to move the adjustment frame beyond the limits of the threaded portion of the adjustment screws 102, 103.

As may be noted from FIGURES 1 and 2, switch member 457 is mounted on the channel 43 with its movable switch member extending vertically intermediate upper adjustment stop 460 and lower adjustment stop 461. The stops 460, 461 are clamped in vertical spaced relationship on a rod 462 which is mounted by brackets 463. Brackets 463 in turn are mounted on frame member 99 adjacent frame member 97. Accordingly, as the adjustment frame 22 is vertically moved through the operation of motor 112, it likewise vertically moves the rod 462; and in the event it is moved sufficiently that either stop member 460 or 461 is brought into engagement with its movable switch member 456, the switch member is moved to a position to break the electrical connection between the terminals 454, 455. Thus, switch 457 limits the maximum vertical movement of the adjustment frame 22 relative the main frame.

A line $L_3$ connects terminal 455 to the first terminal 466 of a glue cylinder switch 467, line $L_3$ having junctions 469–473 inclusive thereon. Junction 469 is connected by a line 476 to a first terminal 477 of the feeder cylinder switch 226. Switch 226 also includes a second terminal 478 and a movable switch member 225 which is resiliently retained in an "off" position, but upon the feeler cylinder piston rod 217 dropping down to have jam nut 219 abut against switch member 225, it moves switch member 225 to break the electrical connection between terminals 477, 478. Terminal 478 is connected by a line 479 to a junction 480, junction 480 in turn being connected by a line 481 to a first terminal 482 of the up switch 240. The up switch includes a second terminal 483 and a movable switch member 484 that normally electrically connects terminals 482, 483. Up switch 240 also includes a third terminal 485, a fourth terminal 486, and a movable switch member 487 that normally does not connect terminals 485, 486. The up switch push button 242 operates switch members 482, 487 simultaneously such that when the switch operator 218 bears against roller 241, switch member 487 is moved to a position to electrically connect terminals 485, 486 and to move switch member 484 to break the electrical connection between terminals 482, 483. However, when switch operator 218 is moved out of abutting engagement with roller 241, linkage 235 is resiliently urged to a position that the electrical connection between terminals 485, 486 is broken, and switch member 484 is moved to a position that terminals 482, 483 are again electrically connected.

Terminal 483 is connected by a line 491 to a junction 492 which in turn is connected by a line 493 to the first terminal 494 of a push-button "up" switch that also includes a second terminal 495 and a push button 496. Push button 496 is resiliently urged to an open position, but upon manually being depressed electrically connects terminals 494, 495. Terminal 495 is connected by a line 497 to junction 498, which in turn is connected by a line 503 to junction 452. Junction 498 is also connected by a line 499 to the first terminal 500 of a push button "down" switch that also includes a second terminal 501 and a movable switch member 502 that is resiliently urged to an "off" position, but upon being manually depressed electrically connects terminals 500, 501. Terminal 501 in turn is connetced by a line 504 to a junction 505.

Terminal 486 is connected by a line 507 to a first terminal 508 of the "down" switch 233. The down switch also includes a second terminal 509 that is connected by a line 510 to junction 505, and a third terminal 511 that is connected by a line 512 to junction 480. The down switch also includes a movable switch member 236 that is movable between a first position electrically connecting terminals 511, 508 and a second position electrically connecting terminals 509, 511. Switch member 236 is operated through linkage 235 such that when roller 234 is moved by switch operator 218, the electrical connection between terminals 508, 511 is broken and terminal 511 is electrically connected to terminal 509. However, when switch operator 218 is elevated relative roller 234, the electrical connection between terminals 509, 511 is broken and terminal 511 is again electrically connected to terminal 508.

A conventional interlock 516 and a starter 517 are connected in series across junctions 492 and 518, junction 518 being connected by the line 521 to junction 433. A second interlock 519 and a starter 520 are connected in series across junctions 505 and 518, starter 517 being connected to motor 112 to power the motor to rotate the motor shaft in one direction when power is applied across junctions 492 and 518, and starter 520 being connected to motor 112 such that the motor shaft is rotated in the opposite direction when power is applied across junction 505 and 518. Interlocks 516 and 519 are provided so that power can be applied only to starter 517 or only to starter 520, but not both of the said starters at the same time.

Terminal 485 is connected by a line 523 to junction 524, the solenoid coil 525 of the solenoid operated air valve 353 being connected across junctions 524 and 526. Upon energizing coil 525, an internal valve member (not shown) is operated to fluidly connect port 352 to port 355, and port 354 to port 356 respectively, provided the aforementioned fluid connection has not already been made. Junction 434 is connected via line 527 to junction 526, a second solenoid coil 528 of valve 353 being connected across junction 526 and the first terminal 529 of a momentary contact switch 530. When the solenoid coil 528 is energized, the valve member (not shown) of valve 353 is moved to a position to respectively connect port 352 to port 356, and port 354 to port 355. To be noted is that only one of the solenoid coils 525 and 528 is energized at any given period of time, and that the itnernal fluid connections remain the same upon the de-energization of the respective coil until the other coil is energized.

Switch 530 includes a second terminal 531, a third terminal 532 that is connected by a line 534 to junction 470, and a switch member 533 that normally connects terminals 531, 532; but is movable to a position to momentarily break the connection between terminals 531, 532 and electrically connect the terminals 529, 532, and thence through conventional internal structure automatically moves back to make the connection between terminals 531, 532.

Switch 530 is mounted on the bottom plate 50 of the left hand side conveyor and has a pivotally mounted arm 535 that extends across the path of movement of a bag to be operated by a bag that has been conveyed by the conveyor assembly to a position vertically beneath the feeler foot and longitudinally centrally located relative the bag opening fingers 280, 281. Upon the bag striking arm 535, the arm is pivoted from its datum position to operate switch 533 to momentarily connect terminals 529, 532 but does not retain switch member 533 in this position even though the bag remains in engagement with the arm in its pivoted position. Further, even after the bag has been subsequently moved out of engagement with arm 535, said arm 535 in returning to a datum position does not operate switch member 533, but only when the next bag again moves switch member 535 from its datum position. The electrical connection between terminals 529, 532 is of a sufficient duration that solenoid coil 528 moves the valve member of valve 353 to the solenoid coil energized position previously described for coil 528.

Terminal 531 is connected by a line 540 to a first terminal 541 of a starter 562 for conveyor drive motor 71, said starter including a second terminal 542 and a switch member 543 that upon energization of the conveyor motor starter, electrically connects terminals 541 and 542, and upon de-energization, breaks the connection between terminals 541, 542. Terminal 542 is connected by a line 544 to a junction 454 which in turn is connected by a line 546 to a first terminal 547 of a timer 557. The last mentioned timer also includes a second terminal 549 and a movable timer member 548 that upon a preset delay period after energization of the timer, electrically connects terminals 547, 549 and retains said connection until solenoid coil 550 has been energized for a long enough period that the solid line internal fluid connections of FIGURE 17 for valve 360 have been made. Upon the de-energization of the timer solenoid of timer 557, this timer automatically moves switch member 548 to break the electrical connection between terminals 547, 549.

A solenoid coil 550 of solenoid operated air valve 360 is connected across terminal 549 and junction 436. Valve 360 also includes a second solenoid coil 551 connected across junctions 435, 524. Valve 360 is of a construction that when solenoid coil 550 is energized, it moves its valve member to a position that port 361 is connected to port 362, and port 363 is connected to port 364 respectively, provided such a connection has not already been made; and upon energization of solenoid coil 551, the valve member (not shown) is moved to fluidly connect port 362 to port 364 and port 361 to port 363 respectively. However, merely de-energizing 550 or 551, does not result in the last mentioned valve member being moved.

Junction 545 is connected by a line 555 to a junction 556, the timer solenoid of timer 557 being connected across junctions 556, 437. Energization of the solenoid of timer 557 operates switch member 548 in the manner previously described.

Junction 438 is connected by a line 560 to junction 561, the solenoid coil for starter 562 being connected across junctions 561, 556. Upon power being applied from lines $L_2$ and $L_3$ to junctions 556, 561, starter 562 is energized to apply power to motor 71 and also to move its switch member 543 to electrically connect terminals 541, 542 in the manner previously described.

Junction 556 is connected by a line 564 to a junction 566 which in turn is connected by a line 567 to a first terminal 568 of a push button, "on" switch. The last mentioned switch also includes a second terminal 569 that is connected by a line 570 to junction 472 and a push button 571 that upon being manually depressed electrically connects terminals 568, 569; but otherwise breaks the connection between said terminals.

Junction 566 is connected by a line 574 to a first terminal 575 of a re-start switch 576, switch 576 having a second terminal 577 connected by a line 578 to junction 473. Switch 576 has a switch member 579 that is resiliently urged to a position electrically connecting terminals 575, 577. As may be noted from FIGURE 13, switch 576 is mounted by a bracket 580 on frame member 96 in a position that when the creasing roller T-plate 147 is at its lowermost elevation, the upper end of the left guide rod 148 is out of contact with the roller 581 of the switch member operating linkage 582 for switch member 579. At the time roller 581 is out of contact with the guide rod 148, switch member 579 electrically connects terminals 575, 576. However, when guide rod 148 is at at least a slightly higher elevation, it moves roller 581 and thereby linkage 582 to move the switch member 579 to break the electrical connection between terminals 575, 577.

The adhesive applicator switch 467 includes a second terminal 587 that is connected by a line 588 to junction 589, and a switch member 590 that is resiliently retained in an "off" position, but movable to a position to electrically connect terminal 466 to terminal 587. As may be noted from FIGURES 1 and 14, switch 467 is mounted on angle iron 139 at a location beneath table 137 and longitudinally adjacent the continuous spray gun 322. Switch 467 has a switch operating member 591 extended out into the path of travel of a bag on the conveyor assembly to move switch member 590 to the closed position at the time the bag is longitudinally moved to have the flaps pass immediately vertically adjacent the glue guns during the interval of time the bag abuts against said switch operating member.

Junction 589 is connected by a line 591 to junction 595, the solenoid coil 592 of the gluing timer 593 being connected across junctions 595, 561. Timer 593 includes a first terminal 596 that is connected by a line 597 to junction 595, a second terminal 598, a third terminal 599, and a fourth terminal 600 that is connected by a line 601 to junction 589. Timer 593 also includes a switch member 602 that is movable to a position to electrically connect terminals 596, 598; and a switch member 603 that is movable to a position to electrically connect terminals 599, 600. The timer motor 604 is connected across terminal 599 and junction 605, timer 593 being of a construction that upon energizing solenoid coil 592, switch members 602, 603 respectively are moved to electrically connect terminals 596, 598 and terminals 599, 600. At the end of the timing cycle, the motor operates switch members 602, 603 to break the aforementioned electrical connections until the timer coil 592 is again energized.

The solenoid operated air valve 424 for the continuous adhesive applicator cylinder 338 has a solenoid coil 607 connected across junction 605 and terminal 598. Valve 424 is of a construction that when coil 607 is energized, port 426 is fluidly connected to port 423, and port 427 is fluidly connected to port 425; however, upon de-energization of solenoid coil 607, the aforementioned connections are broken, and port 427 is connected to port 426, and port 425 is fluidly connected to port 423.

Junction 471 is connected by a line 610 to junction 611 which in turn is connected by a line 612 to the first terminal 613 of a switch 614. Switch 614 also includes a second terminal 616 and a switch member 615 that is resiliently urged to electrically connect terminals 613, 616 but movable to break the aforementioned connection. Junction 611 is also connected by a line 620 to first terminal 621 of a switch 622. Switch 622 also includes a second terminal 623 and a switch member 624 that is resiliently urged to a position to electrically connect terminal 621, 623 but movable to break the aforementioned connection.

As may be noted from FIGURES 5, 6 and 14, switches 622, 614 are mounted transversely adjacent one another in overhanging relationship to the cylinder 338, said switch members being secured to a bracket 627 which in turn is welded to plate 337. Switch 614 has switch member operated linkage 629 that mounts the cam follower roller 630, while switch member 622 has switch operated linkage 631 that mounts the cam follower roller 632. A cam block 633 and a second cam block 634 are provided on the guide rod 335 such that with said guide rod in a datum condition, the cam blocks are generally located transversely intermediate roller 630, 632. In the aforementioned datum condition, roller 632 bears against cam block 634 to, through linkage 631, hold switch member 624 in an open condition, but upon movement of guide rod 335 in the direction of the arrow 187, cam block 634 moves from beneath roller 632, and accordingly, switch member 624 moves to electrically connect terminal 621, 623. In the guide rod 335 datum condition, cam block 633 is located to the right of roller 630, but upon sufficient transverse movement of the guide rod in the direction of arrow 187, cam block 633 moves roller 630 whereby said roller acting through linkage 629 moves switch member 615 to an open condition. Blocks 633, 634 are clamped on guide rod 335 such that they may be transversely adjusted relative one another and relative to the guide rod for purposes to be set forth hereinafter.

The solenoid coil 641 of valve 413 is connected across terminal 623 and junction 439, valve 413 in a solenoid coil energized condition providing a fluid connection between ports 412, 416, and in a de-energized condition breaking the aforementioned fluid connection, and connecting port 416 to the exhaust port 418. Valve 411 has a solenoid coil 642 connected across terminal 616 and junction 643, junction 643 being connected by a line 644 to junction 439. When coil 642 is energized, a fluid connection is made between ports 410, 414; and when said coil is de-energized, the aforementioned connection is broken and port 414 is connected to exhaust port 418.

The structure of the apparatus of this invention has been described, the operation thereof will now be set forth. For purposes of facilitating the description of the operation of this invention, it is to be assumed that it is being used in conjunction with a conventional conveyor (not shown) for delivering, successively, bags in an upright condition to the forward end of the conveyor assembly 21; and that a conventional compression roller conveyor (not shown) is provided for receiving bags from the rearward end of conveyor assembly 21 and compressing the bag top closure as the adhesive on the bag top closure is drying and setting. Further, it is assumed that the side conveyors have been adjustably set relative one another and the bottom conveyor such that the adjacent inner belt runs of the side conveyors will firmly hold the bag against displacement from an upright condition, and that its upper belt runs are substantially below the product height in the bag (for example, 2½ inches for one model). With the side assemblies set, the hand crank 134 is turned so that the adjacent vertical surfaces of tables 137, 138 and angle irons 139, 140 which respectively extend in longitudinal planes are of a slightly greater spacing than the vertical spacing of the adjacent surfaces of the side conveyor belts.

With the tables adjustably set, proper transverse width entry and exit shoes are respectively mounted on bracket 270, and block and mounting plate 293. The proper width shoe is a fraction of an inch less than the transverse spacing of adjacent vertical surfaces of angle irons 139, 140, it being noted that tables 137, 138 have been transversely positioned such that the shoes are transversely centered relative the planes of adjacent vertical surfaces of the tables and angle irons.

Also to be assumed is that valve 348 is closed and switch member 446 is in the "off" condition. At this time, a coil spring in cylinder 153 acts through the piston to retain the piston rod 154 in its retracted condition, and accordingly, stud 160 is in underlying relationship to mounting member 161.

Upon opening valve 348, air under pressure is applied through valve 360 to the lower end of cylinder 143 and to the lower end of cylinder 215 (valves 353 and 360 having the internal fluid connection shown in solid lines in FIGURE 17). This results in piston rod 144 being elevated to its datum condition. At the same time, air under pressure is applied to cylinder 153 to move the piston rod 154 to the extended condition of FIGURE 11 and thereby move stud 160 away from the position it extends beneath mounting member 161. However, since air under pressure is being applied to the lower end of cylinder 143, plate 147 is retained adjacent plate 142.

In initially starting a run of bags (after switch 446 has been closed), the manual up switch 496, or manual down switch 502 is depressed to actuate motor 112 to adjust the table such that the top surfaces of said tables 137, 138 are at the height of the normal product level in the bag. After this is done, the stops 460, 461 are set such that the adjustment frame may be moved approximately the same amount either in an upward or downward direction without opening switch 457. This provides a stop that shuts off the machine in the event that a bag with an extremely high or low product height is conveyed beneath the feeler foot, and to keep the machine from trying to correct beyond its limits as will become more apparent hereinafter.

Also, upon opening valve 348, air under pressure is applied to the upper end of cylinder 267 and thereby elevates the entry folder shoe to its datum position of FIGURE 1; and air under pressure is applied to the forward end of cylinder 310 to move the exit shoe to its datum position of FIGURE 15, provided it is not in this position. In this connection it is to be noted valve 353, 360 are of a conventional construction having manual valve member actuating buttons (not shown) for moving the respective valve member to make the internal fluid connections to result in the shoes, at this time, being moved to their datum positions, provided the proper internal connections are not existing at the time valve 348 is opened.

After switch member 446 has been closed, the push button start switch 571 is depressed to electrically connect terminals 568, 569 to energize starter 562 and thereby motor 71. As a result, the upper run of the bottom conveyor belt and the inner runs of the side conveyor assemblies are driven in synchronism in a longitudinal rearward direction of arrow 95.

At the time the starter push button 571 is depressed, the timer solenoid of timer 557 is also energized to at the end of its timing cycle, move the timer switch member 548 to electrically connect terminals 547, 549 for a sufficient interval of time that the thereby energized solenoid coil 550 operates the valve 360 to respectively connect port 361 to port 362, and port 364 to port 363 (solid line position of FIGURE 17). The timer solenoid of timer 557, after it has moved switch member 548 to electrically connect terminals 547, 549, retains this electrical connection until said timer solenoid is de-energized. To be noted is that the time delay between initially energizing timer solenoid of timer 557 and its initially connecting terminal 547, 549 is sufficient that the bag being conveyed by the conveyor assembly is moved only a few inches as will become more apparent hereinafter. As a result of making the solid line fluid connections for valve 360 shown in FIGURE 17, which would be the same as the fluid connections at the time the machine was shut down or the same made at the time the unit of this invention is initially started, no movement of the structure operated by cylinders 143, 267 and 310 takes place during the time the timer 557 runs through the first timing cycle after starting up the apparatus of this invention unless one of switch members 446, 450 or 455 is opened.

After motor 71 has been energized through depressing push button 571, the bag is advanced by the conveyor assembly to a position to engage arm 535 and thereby momentarily move switch member 533 to a position to electrically connect terminals 529, 532. Terminals 529, 532 are electrically connected for a sufficient period of time that the resulting energization of coil 528 results in port 352 being fluidly connected to port 356, and port 354 being fluidly connected through port 355; and thence switch member 533 automatically moves to again electrically connect terminals 331, 532. During the interval of time that terminals 529, 532 are electrically connected, starter 562 is deenergized to stop conveyor motor 71 and to break the electrical connection between terminals 541, 542. As a result, switch member 533 returning to a position to electrically connect terminals 531, 532 does not result in conveyor motor 71 being actuated at this time. Also to be noted is that switch member 533 moving to electrically connect terminals 529, 532 results in the timer solenoid of timer 557 being de-energized, and as a result switch member 548 moves to break the connection between terminals 547, 549. Timer 557 is not re-energized until such time as a circuit is provided to again energize starter 562.

The fluid connections of valve member 353 resulting from the energization of coil 528 applies air under pressure to the upper end of feeler rod cylinder 215 and exhausts air through line 359 from the lower end. This results in piston rod 217 being moved from its retracted position of FIGURE 10 to its extended position of FIGURE 9. Piston rod 217 in an extended position moves switch member 225 to electrically connect terminals 477, 478; and in moving to an extended position permits the feeler rod 221 to move downwardly until either lug 218a engages jam nut 219 or the feeler rod foot 223 is stopped by product 700 in the bag abutting against stop arm 535. Assuming that the level of product is below the top surfaces of the tables sufficiently that lug 218a abuts against jam nut 219 and thereby foot 223 is held vertically spaced from the product, switch operating member 218 in moving downwardly moves roller 241 and associated linkage operate switch member 487 to a position to electrically connect terminals 485, 486, and switch member 484 to break the electrical connection between terminals 482, 483. Just after roller 241 thus moves its associated linkage, surface 218c of switch operating member abuts against roller 234 to through its associated linkage move switch member 236 to electrically connect terminals 509, 511. As a result, a circuit is provided to energize starter 520 and thereby motor 112 to through its drive connection to screws 102, 103, turn said screws in a direction that the adjustment frame moves downwardly relative the main frame. This downward movement of the adjustment frame continues until the feeler foot 223 has engaged product in the bag. The feeler foot in engaging product in the bag will stop any further downward movement of rod 221 and as a result nuts 219 move downwardly relative bag 218a. Slight further downward movement of the adjustment frame will thence result in switch 233 being moved to a position that its roller 234 no longer abuts against surface 218c, and at this time, linkage 235 and switch member 236 are spring urged to a position to again electrically connect terminals 508, 511 and break the connection between terminals 509, 511. Assuming that at this time surface 218b still retains power 241 in a depressed condition, breaking the connection between terminals 509, 511 de-energizes starter 520 and as a result stops motor 112.

In order to better understand the automatic adjustment feature of the adjustment frame, it will now be assumed that the product level in the bag engaging arm 535 is at a higher level than the top surfaces of the tables. Proceeding on the last mentioned assumption, air is again applied to the upper end of cylinder 215 and piston rod 217 drops to actuate switch 226 to a closed position. However, the feeler foot upon engaging product in bag holds the feeler rod at an elevation that surface 218b is above and out of engagement with roller 241. At this time there is provided a closed circuit through switch members 225, 484 for energizing starter 517 which, when energized, actuates motor 112 to through its drive connection to screws 102, 103, turn said screws in a direction that the adjustment frame and tables 137, 138 are moved upwardly relative the main frame. During this movement of the adjustment frame in an upward direction feeler rod 221 remains stationary since lug 218a is above the upper nut 219. This upward movement of the adjustment frame relative the feeler rod continues until it has been moved upwardly sufficiently that roller 241 is brought into engagement with surface 218b whereby through associated linkage 235, switch member 484 is moved to a position to break electrical connection between terminals 482, 483 and switch member 487 is moved to electrically connect terminals 485, 486. At this time switch operating member surface 218c is out of contact with roller 234 and as a result the starter 517 is de-energized to de-actuate motor 112, and starter 520 remains de-energized.

After the adjustment frame has moved to a position that the top surfaces of the tables are in proper relationship relative the level of the product of the bag abutting against arm 535 (or if no adjustment of the elevation of the adjustment frame is required), then switch member 225 electrically connects terminals 477, 478; switch member 236 electrically connects 508, 511; and switch member 487 electrically connects terminals 485, 486 whereby solenid coil 525 is energized. Energizing solenoid coil 525 results in the previously formed fluid connections of valve member 353 being broken, and air under pressure being applied from port 352 to port 355, and port 356 being connected to exhaust port 354. This results in piston rod 217 being retracted; and during the initial retraction movement, switch member 225 breaks the electrical connection between terminals 477, 478 and de-energizes coil 525. However, merely de-energizing coil 525 does not change the internal fluid connections of valve 353. Also during the initial retracting movement of said piston rod, nut 219 is brought into engagement with lug 218a whereby feeler rod 221 is elevated. Elevating the feeler rod results in switch member 484 electrically connecting terminals 482, 483 and switch member 487 breaking the electrical connection between terminals 485, 486.

At the same time that solenoid coil 525 is energized, solenoid coil 551 is also energized to operate valve 360 to break the previously formed fluid connections and to fluidly connect port 362 to port 364 to apply air under pressure to junctions 368, 370, and to fluidly connect port 361 to exhaust port 363. At the time air under pressure is applied at junctions 368, 370, this pressure is initially applied to the lower end of cylinder 267 to retract piston rod 266 and thereby turn crank shaft 252 in the direction of arrow 283. However, due to time delays 383, 392, there is a delay in the application of air under pressure to the upper end of cylinder 143 and to the longitudinal rearward end of cylinder 310.

Rotation of crank shaft 252 in a direction opposite arrow 283 arcuately swings the entry shoe downwardly and rearwardly to the level slightly above the top surfaces of the tables 137, 138. This rotation of the shaft 252 through the connection to the nozzle arms 280, 281, operate said nozzle arms to swing from their datum position of FIGURE 4 in a direction of arrows 284, 285 respectively to enter the bag and push outwardly on the upper longitudinally central portion of side walls 652, 653 prior to the time the entry shoe engages front wall 654. This aids the folder shoes in making a better fold, primarily on gusseted type bags, which are normally conveyed to have their gusseted walls extend generally transversely. To be noted is that as the crank shaft is rotated, cam 406 operates valve 399 such that air under pressure is applied at the outlet nozzles of the tubes 283 on arms 280, 281 as the lower end of said arms enter the bag and facilitate moving the side walls outwardly. This feature is particularly desirable in case of limp bags such as those made of relative light weight plastic material and extensible as it facilitates obtaining a more uniform fold.

Time delay 383 delays the application of air under pressure through line 386 to cylinder 310 until the entry folder shoe has been moved about ¾ of a full arc of travel from its datum condition; however, the entry shoe and exit shoe are respectively moved at rates that the entry shoe engages front wall 654 at substantially the same time that the exit shoe engages the upper portion of rear wall 655. This timing of movement of shoes minimizes the application of forces tending to tip the bag.

The shoes come together at substantially the same rate of speed until they are closely adjacent one another and their adjacent curved end portions are longitudinally centrally located relative the then remaining vertical portions of side walls 652, 653, i.e., the position of FIGURE 6. As a result of the upper portions 654b, 655b of the bag front and rear walls are folded over the top of the product in abutting relation with said product and the resulting transversely extending tabs 652a and 653a respectively are inclined upwardly and transversely outwardly at acute angles. That is, tab 652a extends in overhanging relationship to table 137 and tab 653a extends in overlying relationship to table 138.

Sufficient delay is imposed by time delay 392 to the application of air under pressure to the upper end of valve 143, that the piston rods controlling the movement of the exit and entry shoes toward one another have substantially moved to their limit position prior to the time piston rod 144 begins its downward movement. The lowering of piston rod 144 moves T-bar 147 and the structure depending therefrom in a downward direction whereby cam follower rollers 192 initially engage the inclined portions of cam tracks 193, 194 respectively, and thence as piston rod 144 continues to move downwardly, cam followers 192 riding on cam tracks, force arms 173, 174 to respectively pivot in the direction of the arrows 175, 176 about pivot shaft 169.

At this time nozzle arms 280, 281 have been rotated sufficiently away from their datum position that still further downward movement of the piston rod 144 results in creasing rollers 183, 184 respectively engaging tabs 652a, 653a adjacent their juncture with the then remaining vertical portions of walls 652 and 653 respectively, but above tables 137, 138 to force said tabs into engagement with the top surfaces of tables 137, 138 respectively. Now further movement of the piston rod results in the creasing rollers being moved transversely apart relative to one another, and in part due to the provision of the coil spirngs resisting the transverse separating movement of the creasing rollers, sufficient pressure is applied by creasing rollers to the tabs to form sharp creases such as illustrated in FIGURE 5 while rolling the tabs flat and applying forces to said tabs to tend to transversely move the respective tab transversely outwardly of the respective vertical sidewall portion to which it is joined. Providing the creases in the tabs facilitate subsequently completing the bag top closure while providing a top closure having a close fit with the product in the bag.

As may in part be noted from FIGURE 13, as the creasing rollers move from the dotted line position shown for roller 183 in FIGURE 13, the tab hold-down rods 164 are still a substantial vertical distance above the tables. However, as the creasing rolls move outwardly from one another toward the outer transverse ends of the tabs they crease, the lower, horizontally rearwardly extending portions of the hold-down rods closely approach the tabs. At the time the aforementioned portions of hold-down bars closely approach the tabs, the creasing rollers have already passed transversely outwardly of the tab hold-down rods, and as the creasing rolls move their outermost transverse positions, the tab hold-down rods hold the tabs down and continue to do so as the tabs are subsequently moved toward the glue applicators 322, 323, as will be described below.

As the piston rod 144 is moved to the lower end of its path of movement, cam follower rollers 205 trip cam tracks 201, 202 to pass transversely outwardly thereof as previously indicated, and the upper end portion of the left hand guide rod 148 has moved out of engagement with roller 581 of the restart switch 576. As a result, switch member 579 now, through is resilient urging, moves to electrically connect terminals 575, 577. This completes a circuit that is the same as the circuit completing by depressing the push button "start" switch 571 and results in conveyor motor 71 being started to initiate movement of the bag and the solenoid of timer 557 being energized; it being noted that as the bag moves past arm 535, switch member 533 is not moved to break its electrical connection between terminals 531, 532. However, due to the provision of timer 557, the entry and exit shoes remain stationary for a preset interval, which is approximately the period of time required for the bag to be conveyed to a position that horizontal edge 654a (that in the bag open condition of FIGURE 4 in part defines the bag mouth) is at a location that it is approximately longitudinally centered relative the horizontal portion of the exit shoe 291. At this time, the timer 557 moves switch member 548 to electrically connect terminals 547, 549 to energize solenoid coil 550. As a result, exit shoe 291 remains stationary until the bag has been moved to position edge 654a as above indicated. Energizing coil 550 operates valve 360 to apply air under pressure through line 388 to cylinder 310 to move piston rod 309 in a longitudinally rearward direction at substantially the same rate that the bag is being moved by the conveyor to thereby hold the folded portions of the front and rear bag walls in a generally horizontal condition as the bag is further conveyed; and apply air under pressure to the upper end of cylinder 267 to move the piston rod 266 to its extended condition and thereby the entry shoe and the bag opening fingers and air nozzles to their datum condition.

Energizing solenoid coil 550 also operates valve 360 so that air under pressure is applied to the lower end of cylinder 143 and accordingly piston rod 144 and the structure mounted on T-bar 147 is moved in an upward direction. Slight upward movement of bar 147 results in the upper end portion of the left hand guide rod 148 being moved into a position to move roller 581, and therethrough switch member 579 to break the electrical connection between terminals 575, 577. However, by this time the starter hold-in circuit through switch member 543 connecting terminals 541, 542 has been completed, and accordingly both starter 562 and timer 557 remain energized. As T-bar 147 is moved upwardly coil springs 196 cause the creasing roller arms 173, 174 to pivot toward one another in a direction opposite arrows 187, 188 respectively. The initial movement of the creasing arms results in cam rollers 205, 205 being brought into engagement with the transverse outer surfaces of cam return tracks 201, 202; and as a result, creasing rollers 183, 184 are returned to their datum position through different paths of movement than which they were moved through from their datum position through positions for creasing the tabs as previously described. Accordingly, the creasing rollers do not engage the tabs as they are being returned.

Prior to the time the lower horizontal legs of the tab hold-down rods have raised to an elevation above the maximum elevation of the inclined portions 332a of the tab hold-down guides 332, the conveyor assembly has conveyed the bag to a position that the forwardmost portions of the tabs at least in part extend beneath the inclined guide portions 332a. Upon further movement of the bag, the forwardmost portions of the tabs are in overlying relationship to table cutouts 333 and in underlying relationship to the nozzles of the adhesive applicator guns 322, 323 respectively. As the tabs begin to move beneath the gun nozzles 28a, the rearward wall of the bag being conveyed engages switch arm actuator 591 (see FIGURE 14) of the adhesive applicator switch 467 to move switch member 590 to electrically connect terminals 466, 587. As a result, timer solenoid coil 592 is energized to move switch member 602, 603 to respectively connect terminals 596 and 598, and 600 and 599. This results in timer motor 604 being energized and immediately starts the timing cycle. At the end of the timing cycle, the timer motor moves switch member 602, 603 to an "open" condition and retains them in an open condition until after the electrical connection between terminals 466, 587 has been broken.

At the time solenoid coil 592 operates switch member 602 to a "closed" condition, solenoid coil 607 of the air control valve 424 is energized to thereby operate said valve to fluidly connect port 425 to the exhaust port 427, and port 423 to port 426 to apply air under presssure through line 428 to cylinder 338. This results in piston rod 336 being moved transversely to the left. Slight movement of the piston rod to the left, and thereby guide rod 335, moves cam block 634 to a position out of abutting engagement with roller 632 and as a result, switch member 624 moves to a position to electrically connect terminal 621, 623. This energizes solenoid coil 641 which in turn operates valve 413 to fluidly connect ports 412, 416 to apply air under pressure to gun 322. This operates gun 322 to downwardly spray adhesive through its nozzle 28a onto the portion of tab 652a therebeneath.

At about the same time that cam block 634 moves out of engagement with roller 632, cam block 633 moves into engagement with roller 630 which in turn through linkage of switch 614 results in switch member 615 moving to a position to electrically connect terminal 613, 616. This energizes solenoid coil 642 whereby port 410 is fluidly connected to port 414. Connecting port 410 to port 414 applies air under pressure to spot gun 323 which operates said gun to spray adhesive downwardly onto the portion of tab 653a that is directly therebeneath. Further leftward movement of rod 335 moves cam block 633 out of engagement with roller 630, and as a result, switch member 615 moves to an open condition and de-energizes coil 542. As a result, the fluid connection between port 410 and 414 is broken, and gun 323 stops spraying glue. During the period of time that block 633 was in operative engagement with roller 630, a first spot of adhesive 660 (see FIGURE 15) is sprayed on flap 653a. Rod 335 continues to move leftwardly until nut 380 abuts against plate 339. Since the transverse movement of guide rod 335 and gun 322 is at right angles to the direction of longitudinal movement of the flap 652a therebeneath, from the time gun 322 is actuated and until the end of the leftward movement of said gun, a first adhesive strip 661 is applied to flap 652a (see FIGURE 16).

Assuming that the tabs have an edge 656 that extends generally parallel to the direction of movement such as shown in FIGURE 16, then the timing cycle of timer motor 604 would be set such that air under pressure is applied through line 428 to cylinder 338 to retain piston rod 336 in a position that nut 380 abuts against stop plate 339 for a sufficient period of time that an adhesive strip 657 extending parallel to the direction of motion of the bag is formed, and immediately thereafter operates switch members 602, 603 to an open condition. Opening switch member 602 de-energizes solenoid coil 607 of valve 424 and as a result the previously formed fluid connections are broken and port 426 is connected to exhaust port 427 while port 423 is connected to port 425 to apply air under pressure to the left end of cylinder 338. This results in piston rod 336 being moved toward its extended position (to the right as shown in FIGURE 14) to initiate beginning of adhesive strip portion 658. Slight rightward movement of piston rod 336 results in cam block 633 passing beneath roller 630; and during this passage, switch member 615 is moved to and held in a position electrically connecting terminals 613, 616 whereupon the spot gun 323 is operated to apply a second spot of glue 659 to flap 653a. After cam block 633 is moved out of engagement with roller 630, switch member 615 moves to an open condition and gun 323 discontinues applying adhesive to the flap. Further rightward movement of the piston rod 336 brings cam block 634 in engagement with roller 632 and thus switch member 624 is moved to an open condition to de-energize solenoid coil 641 whereby the fluid connection between ports 412 and 416 is broken. As a result, air under pressure is no longer applied to gun 322 and thereupon gun 322 discontinues spraying adhesive.

To be noted is that adhesive strip 661, 657 and 658 constitute a continuous adhesive strip wherein strip portion 661 begins at a location closely adjacent and vertically above the vertical portion of side wall 652, thence extends parallel and adjacent to the transversely outwardly and forwardly inclined crease to join with adhesive strip 657 which extends in a longitudinal direction parallel but opposite to the direction of movement of the bag on the conveyor. Strip 657 in turn is joined to strip 658 which extends parallel to and adjacent the transverse inwardly and forwardly inclined crease edge to a location just short of being vertically above the vertical portion of side wall 652.

Also to be noted is that during the time the bag initially begins to move under the adhesive guns, the exit shoe continues to move with and over the folded front and rear wall portions 654b, 655b of the bag as it is conveyed to hold said portions in a generally horizontal condition. Further the tab guides 332 have rearward horizontal flanges 332b extending to a location just forwardly of the location on the tabs that glue is applied by the guns to hold the tab portions to which glue is being applied, generally flat.

At about the time that piston rod 336 has again reached its datum condition, piston rod 309 has reached its datum condition, and as a result the exit shoe no longer continues to travel with the bag. However, at this time, an exit shoe extension is underlying each of the folders 316, 318. The conveyor assembly continues to move the bag and since flap 653a is brought into engagement with folder 318 prior to the time that flap 652a is brought into engagement with folder 316, flap 653a is folded first. Flap 653a moving relative folder 318 results in flap 653a being bent through an arc of approximately 180° whereby adhesive spots 660 and 659 are located transversely on the opposite side of the exit shoe extension 314 from which they were originally located and brought into abutting engagement with the folded horizontal rear wall portion and horizontal front wall portion respectively. Prior to the completion of folding of flap 653a by a folder plate 318, flap 652a is brought into engagement with folder 316 to initiate the folding thereof through an arc of about 180°. However, folder blade 316 curves such that successive portions of flap 652a are not brought into a horizontal condition until such portions have moved longitudinally to the rearward end of the left shoe extension 315 and until after the transversely adjacent portion of flap 653a has been folded into engagement with the horizontal front and rear wall portions and passed rearwardly of folder 318. Thence portions of flap 652a are successively firmly pressed against the immediately underlying portions of, first the horizontal rear wall portion, thence the adjacent top surface of flap 653a and subsequently the adjacent underlying portion of the horizontal part 654b of the front wall. As a result, a sealed bag top closure is formed, spring guides 320, 321 acting to hold the closure in a tightly closed, sealed condition until the bag enters a conventional compression conveyor.

Just after the entry folder shoe has completed its retraction to a datum condition, another bag enters onto the forward end of conveyor assembly 21. The second bag is conveyed in the direction of the arrow 95 to a position that it abuts against the arm 535 of momentary stop switch 530. As a result, switch member 533 is momentarily moved to electrically connect terminals 529, 532 and actuate another cycle of the machine such as described with reference to the structure operated by electrically connecting terminals 529, 532 and the description following thereafter.

The apparatus of this invention conveniently handles flat tubes and SOS bags. Also, an extremely limp bag such as extensible paper bags may be run, however, in such case it is highly desirable to use the air nozzle assemblies in making the initial fold of the bags prior to the exit and entry shoes engaging the bag. That is, the two bag opening fingers entering the bag and pushing outwardly on the sides of the bag and acting in conjunction with the application of air under pressure from the nozzles on the bag opening fingers greatly facilitate properly forming the bag top portion for the subsequent creasing operation.

Additionally, automatic adjustment is provided to obtain tightly folded tops, regardless of variation of product shape. Further, the formed top is creased with rollers to obtain tight folds consistently. Additionally, the continuous adhesive applicator gun in being moved sprays an outline of the bag tab which in turn provides a better seal.

As many widely, apparently different embodiments of the invention may be made without departing from the spirit and scope thereof, it is to be understood that we do not limit ourselves to the specific embodiments herein.

What is claimed is:

1. Apparatus for forming a sealed bag top closure on a bag filled with product comprising a frame, means mounted on the frame for conveying a bag filled with product in a longitudinal rearward direction, said bag having generally vertical front, rear and side wall portions extending above the level of product in the bag and the bag conveyor means, means operated in a predetermined relationship relative the bag conveyor means for folding said wall portions and sealing the wall portions to form a folded, sealed bag top closure in relatively tight overlying relationship relative the product, first means mounted on the frame for mounting the folding and sealing means in overhanging relationship to the bag conveyor means and vertically moving the folding and sealing means within a limited range, said folding and sealing means includes second means for folding said vertical front and rear wall portions into overlying relationship to the product and the side wall portions into tabs extending transversely outwardly in opposite directions, means for applying adhesive to the upper surfaces of at least two of said portions after the tabs have been formed, and means longitudinally rearwardly of the adhesive applying means for folding said tabe into abutting relationship with the molded front and rear portions to form a sealed bag top closure, means for driving the bag conveyor means to move a bag in said direction, and control means for actuating the conveyor drive means to move a bag with said wall portions to a given location relative the folding and sealing means, thence operate said first means to adjustably vertically position the bag folding and sealing means at a proper elevation relative the level of the product in the bag, and thereafter operate the conveyor drive means and bag folding and sealing means relative to one another to form said closure, the control means including means mounted on the first means for determining if and when the first means is at the proper elevation relative the level of the product in the bag at said location, third means operated by said determining means for actuating the first means to move said first means to said proper elevation in the event it is at a different relative elevation and means connected in operative relationship with the third means for operating the second means to fold said portions after the first means is at said proper elevation.

2. The apparatus of claim 1 further characterized in that the above mentioned frame comprises a main frame, that said first means includes an adjustment frame having the second means and adhesive applying means mounted thereon, fourth means mounted on the main frame for mounting and moving the adjustment frame vertically through a limited range relative the main frame, motor means, and means drivingly connecting the motor means to the fourth means to operate the fourth means to vertically move the adjustment frame when the motor means is actuated, and that the third means is connected to the motor means for alternately deactuating the motor means, actuating the motor means to move the fourth means in one vertical direction, and actuating the motor means to move the fourth means in the opposite vertical direction.

3. The apparatus of claim 2 further characterized in that the determining means includes a vertically elongated feeler member mounted on the first means above said location for vertical slidable movement between a datum position relative the first means and a position substantially below said datum position, fifth means mounted on the first means for retaining said feeler member at said datum position, then permit said feeler member moving to its second position, and thereafter return the feeler member to said datum position, and means actuated by the bag being moved to said location for operating the fifth means to permit the feeler means moving toward said second position and operatively connected to the third means to return the feeler member to its datum position after the first means is at said proper elevation.

4. Apparatus for forming a sealed bag top closure on a bag filled with product comprising a frame, means mounted on the frame for conveying a bag filled with product in a longitudinal rearward direction, said bag having generally vertical front, rear and side wall portions extending above the level of product in the bag and the bag conveyor means, means operated in a predetermined relationship relative the bag conveyor means for folding said wall portions and sealing the wall portions to form a folded, sealed bag top closure in relatively tight overlying relationship relative the product, first means mounted on the frame for mounting the folding and sealing means in overhanging relationship to the bag conveyor means and vertically moving the folding and sealing means within a limited range, said folding and sealing means includes second means for folding said vertical front and rear wall portions into overlying relationship to the product and the side wall portions into tabs extending transversely outwardly in opposite directions, means for applying adhesive to the upper surfaces of at least two of said portions after the tabs have been formed, and means longitudinally rearwardly of the adhesive applying means for folding said tabs into abutting relationship with the folded front and rear portions to form a sealed bag top closure, means for driving the bag conveyor means to move a bag in said direction, and control means for actuating the conveyor drive means to move a bag with said wall portions to a given location relative the folding and sealing means, thence operate said first means to adjustably vertically position the bag folding and sealing means at a proper elevation relative the level of the product in the bag, and thereafter operate the conveyor drive means and bag folding and sealing means relative to one another to form said closure, the control means includes means for stopping the conveyor drive means when the bag is at said location and actuating the first means to vertically adjustably position the folding and sealing means, means actuated by the folding and sealing means in said adjusted position for actuating the second means to fold said portions in the above mentioned manner, and means actuated by the second means after the completion of the folding of said front and rear wall portions for restarting the conveyor drive means.

5. The apparatus of claim 4 further characterized in that the means for folding the tabs to form a bag top closure includes a folder blade for each tab and means mounted on the first means for mounting said blades relative to one another and the bag conveyor means to successively fold one tab into at least partial overlying relationship with the folded front and rear wall portions and then the other tab as the bag conveyor means moves the bag after the conveyor drive means has been restarted.

6. The apparatus of claim 5 further characterized in that the adhesive applying means applies adhesive to each of said tabs and includes a first and second adhesive applicator, means for mounting the first adhesive applicator on the first means in position to apply adhesive to one of said tabs between the interval it is formed and is folded by the respective folded blade, and means for mounting the second adhesive applicator on the first means in position to apply adhesive to the other tab as the bag conveyor means moves the bag after the conveyor drive means has been restarted.

7. The apparatus of claim 6 further characterized in that the second applicator mounting means includes means for transversely moving the second applicator over said other tab as it is being conveyed and that the control means includes means operated by the bag being moved from said given location by the bag conveyor means for actuating the second applicator moving means to move the second applicator transverse over said other tab after the conveyor drive means has been restarted.

8. Apparatus for forming a sealed bag top closure on a bag filled with product comprising a main frame, means mounted on the main frame for conveying a bag filled with product in a given longitudinal direction, said bag having front, rear and side wall portions extending above the level of product in the bag, an adjustment frame, means mounted on the main frame and connected to the adjustment frame for mounting the adjustment frame above said conveyor means and vertically adjustably positioning the adjustment frame relative the conveyor means, two folding tables having top surfaces, means mounted on the adjustment frame for mounting said tables at the same elevation and in transverse spaced relationship on opposite sides of the bag being conveyed by said conveyor means, means on the adjustment frame for folding the bag top wall portions to hold the front and rear wall portions into overlying relationship to the product and form a transversely extending tab on either side of the bag, means on the adjustment frame for abutting against the tabs and pressing the tabs agaianst the adjacent table to crease the tabs, means mounted on the adjustment frame for applying an adhesive to the upper surfaces of the creased tabs, means mounted on the adjustment frame for folding the tabs with the adhesive thereon into overlying relationship with the folded front and rear wall portions to form a sealed bag top closure, means for driving the conveyor means to move a bag in a longitudinal direction, and operating the bag top folding and creasing means in the aforementioned manner and in timed relationship to the movement of the bag by the conveyor means, means on the adjustment frame for automatically determining the height of product in the bag on the bag conveyor means relative the tables prior to the operation of the bag top folding means, and means actuated by the height determining means for automatically operating the adjustment frame mounting and positioning means to vertically position the table top surfaces at about the same elevation as the product level in the bag having its product height determined.

9. The apparatus of claim 8 further characterized in that the height determining means is mounted on the adjustment frame vertically above the bag conveyor means, that the driving and operating means includes means for driving the bag conveyor means, conveyor drive control means for automatically stopping the conveyor drive means when the bag that is to have its relative product height determined is vertically beneath the height determining means, said height determining means including means mounted on the adjustment frame for movement between a datum position and a second position determining the level of product in the bag relative the elevation of the table top surfaces and means actuated by the conveyor drive control means for operating the product level determining means toward its second position, and with the product level at about the level of the table tops, return it to its datum position and actuate the bag top folding and creasing operating means, the conveyor drive control means including means actuated by the creasing means completing the creasing of the bag tabs to again actuate the conveyor drive means to drive the bag conveyor means to further move the bag.

10. The apparatus of claim 9 further characterized in that the product level determining means includes a vertically elongated feeler member, and that the product level determining operating means includes power operated means for selectively retaining the feeler member in said datum position, thence permitting the feeler member moving downwardly toward the product, and after the table tops are about at the level of the product level, return the feeler member to its datum position, and means actuated by the conveyor drive control means for operating the power operated means in the above mentioned manner.

11. In apparatus for forming a sealed bag top closure on a bag filled with product comprising a main frame, means mounted on the main frame for conveying a bag filled with product in a given longitudinal direction, said bag having front, rear and side wall portions extending above the level of product in the bag, a second frame mounted on the main frame above said conveyor means, two folding tables having top surfaces mounted on the second frame at the same elevation and in transverse spaced relationship on opposite sides of the bag being conveyed by said conveyor means, means on one of said frames for folding the bag top wall portions to fold the front and rear wall portions into overlying relationship to the product and form a transversely extending tab on either side of the bag in overhanging relationship to the adjacent table surface, means on the second frame for abutting against the tabs and pressing the tabs against the adjacent table to crease the tabs, the bag top creasing means including a pair of longitudinally elongated creasing rollers, means on the second frame for mounting and moving said rollers from a datum position substantially above the tables into engagement with the tab on opposite transverse sides of the front and rear wall folding means after the front and rear wall portions have been folded, thence move said rollers transverse away from one another across the respective tab, and then returning the rollers to the datum position through a path of movement out of engagement with said tabs, and power operated means on one of said frames and connected to the roller mounting and moving means for moving said rollers in the aforementioned manner, means mounted on the second frame for applying an adhesive to the upper surfaces of the creased tabs, means mounted on the second frame for folding the tabs with the adhesive thereon into overlying relationship with the folded front and rear wall portions to form a sealed bag top closure, and means for driving the conveyor means to move a bag in a longitudinal direction, and operating the bag top folding and creasing means in the aforementioned manner in timed relation to the movement of the bag by the conveyor means, the conveyor driving and bag top folding and creasing means including means for actuating the roller power operated means after the bag conveyor means has conveyed a bag beneath the rollers to move the rollers into engagement with the tabs.

12 The apparatus of claim 11 further characterized in that the roller mounting and moving means includes a pivot shaft, elongated arm means for each roller having one end pivotally mounted on said shaft and an opposite end connected to the respective roller for mounting said rollers in transverse spaced relationship, a cam follower on each of said arm means, and trip cam means for each roller pivotally mounted on the second frame for movement to permit the respective roller cam follower to pass therebeneath as the rollers crease the tabs and to be engaged by the respective cam follower to force the rollers to return through said different paths of movement as the rollers are returned to their datum position.

13. In apparatus for forming a sealed bag top closure on a bag filled with product comprising a main frame, means mounted on the main frame for conveying a bag filled with product in a given longitudinal direction, said bag having front, rear and side wall portions extending above the level of product in the bag, a second frame mounted on the main frame above said conveyor means, two folding tables having top surfaces mounted on the second frame at the same elevation and in transverse spaced relationship on opposite sides of the bag being conveyed by said conveyor means, means on one of said frames for folding the bag top wall portions to fold the front and rear wall portions into overlying relationship to the product and form a transversely extending tab on either side of the bag in overhanging relationship to the adjacent table surfaces, the front and rear wall portion folding means including an entry folding shoe, means mounting the entry folding shoe for movement from a datum position above the conveyor means rearwardly through a position to abut against the front wall portion of a bag on the conveyor means, thence to a position folding the front wall portion into engagement with product in the bag and finally to its datum position, a pair of elongated bag opening members having a first end portion and a second end portion, means on the second frame for mounting and moving said bag opening members from a position that their second end portions are above and move closely adjacent one another then bag top side wall portions, next through a path of movement that said second end portions extend into the bag, and prior to the entry shoe folding the front wall portion, forcing the said side wall portions transversely outwardly from one another, and thereafter return said members to said second end portions position, an exit shoe, and means mounting the exit shoe for movement from a datum position remote from and rearwardly of the bag, through a position to abut against the rear wall portion of the bag on the conveyor means, and thence to a position folding the rear portion into engagement with product in the bag, means on the second frame for abutting against the tabs and pressing the tabs against the adjacent table to crease the tabs, means mounted on the second frame for applying an adhesive to the upper surfaces of the creased tabs, means mounted on the second frame for folding the tabs with the adhesive thereon into overlying relationship with the folded front and rear wall portions to form a sealed bag top closure, and means for driving the conveyor means to move a bag in a longitudinal direction, and operating the bag top folding and creasing means in the aforementioned manner in timed relation to the movement of the bag by the conveyor means, the conveyor driving and bag top folding and creasing means including means for operating the entry and exit shoe mounting means to move the shoes to their positions to respectively engage the front and rear wall portions at about the same time.

14. The apparatus of claim 13 further characterized in that the bag member mounting and moving means includes means mounted on the second frame for mounting the bag opening members first end portions for pivotal movement above transversely spaced, longitudinally extending axes, and that the front and rear wall portion folding means includes an air nozzle mounted on each of said member second end portions for movement therewith to discharge air in a flow pattern that extends generally radially relative the respective longitudinal axis and means for applying air under pressure to said nozzles as the bag member second end portions move into the bag.

15. In apparatus for forming a sealed bag top closure on a bag filled with product comprising a main frame, means mounted on the main frame for conveying a bag filled with product in a given longitudinal direction, said bag having front, rear and side wall portions extending above the level of product in the bag, a second frame mounted on the main frame above said conveyor means, two folding tables having top surfaces mounted on the second frame at the same elevation and in transverse spaced relationship on opposite sides of the bag being conveyed by said conveyor means, means on one of said frames for folding the bag top wall portions to fold the front and rear wall portions into overlying relationship to the product and form a transversely extending tab on either side of the bag in overhanging relationship to the adjacent table surfaces, the front and rear wall portion folding means including an entry folding shoe, means mounting the entry folding shoe for movement from a datum position above the conveyor means rearwardly through a position to abut against the front wall portion of a bag on the conveyor means, thence to a position folding the front wall portion into engagement with product in the bag and finally to its datum position, an exit shoe, and means mounting the exit shoe for movement from a datum position remote from and rearwardly of the bag, through a position to abut against the rear wall portion of the bag on the conveyor means, and thence to a position folding the rear portion into engagement with product in the bag, the exit shoe mounting means including means for reciprocally moving the exit shoe through its positions at an elevation substantially the same as that of the table tops, means on the second frame for abutting against the tabs and pressing the tabs against the adjacent table to crease the tabs, means mounted on the second frame for applying an adhesive to the upper surfaces of the creased tabs, means mounted on the second frame for folding the tabs with the adhesive thereon into overlying relationship with the folded front and rear wall portions to form a sealed bag top closure, and means for driving the conveyor means to move a bag in a longitudinal direction, and operating the bag top folding and creasing means in the aforementioned manner in timed relation to the movement of the bag by the conveyor means, the conveyor driving and bag top folding and creasing means including means for operating the entry and exit shoe mounting means to move the shoes to their positions to respectively engage the front and rear wall portions at about the same time, the entry shoe and exit shoe operating means including means for retaining the exit shoe in a stationary condition after it has folded the rear wall portion of the bag until both the front and rear wall portions substantially underlie the exit shoe and thence return the exit shoe to its datum position at substantially the same rate as the bag conveyor means moves the bag.

16. The apparatus of claim 15 further characterized in that the adhesive applying means includes two adhesive applying guns, means on the second frame for mounting each gun above the respective table to direct adhesive downwardly onto the respective tab as it passes therebeneath, and longitudinally to direct adhesive onto said tabs at the time the exit shoe overlies said front and rear wall portions.

17. Apparatus for forming a sealed bag top closure on a bag filled with product comprising a main frame, means mounted on the main frame for conveying a bag filled with product in a longitudinal rearward direction, said bag having vertical front, rear and side wall portions extending above the level of product in the bag and the conveyor means, an adjustment frame, means mounted on the main frame and connected to the adjustment frame for mounting the adjustment frame above said conveyor means and vertically adjustably positioning the adjustment frame relative the conveyor means, feeler means mounted on the adjustment frame for movement from a datum position substantially above the conveyor means to a position abutting against product in the bag having said vertical wall portions, folding and sealing means mounted on the adjustment frame for movement therewith and movable relative thereto for forming said wall portions into a folded, sealed bag top closure in relatively tight overlying relationship relative the product after the adjustment frame has been vertically adjusted for the level of product in the bag having said vertical wall portions, and means for driving the conveyor means, said conveyor driving means including control means on the adjustment frame for sensing the movement of the bag by the bag conveyor means to a position beneath the feeler means, subsequent operating the feeler means to move toward a position abutting against the product and actuating the adjustment frame mounting and moving means to move the adjustment frame to a proper elevation for the bag top closure forming and sealing means to form a tight closure, and then return the feeler means to a datum position and hold it in said datum position and actuate the bag top closure and sealing means to form a folded, sealed bag top closure.

18. The apparatus of claim 17 further characterized in that control means includes means for automatically stopping said conveyor driving means when the bag with the vertical wall portions are beneath the feeler means and substantially at the same time automatically releasing the feeler means to permit it to move toward a product engaging position.

19. The apparatus of claim 17 further characterized in that the bag top folding and sealing means includes means on the adjustment frame for folding the vertical front and rear wall portions to a horizontal condition overlying the product and the side wall portions into tabs extending generally transversely outwardly from one another and the remaining portion of the bag, and means on the adjustment frame for applying adhesive to at least one of said tabs, and that the control means includes means for stopping said conveyor driving means when the vertical wall portions are beneath the feeler means and operating the feeler means to move toward a product engaging position, means controlled by the relative elevation of the feeler means to the product in the bag for automatically actuating the adjustment frame mounting and moving means to vertically move the adjustment frame to a predetermined elevation relative the product level, and returning the feeler means to a datum position, means actuated by the automatic actuating means for operating the wall portion folding means to form tabs after the adjustment frame is at a predetermined elevation relative the product level, and means for reactuating the conveyor driving means to further move the bag after tabs have been formed and the adhesive applying means to apply adhesive.

20. The apparatus of claim 19 further characterized in that the reactuating means includes means operated by the tab forming means completing the formation of tabs to reactuate the conveyor driving means to drive the bag conveyor means to further move the bag, and means actuated by the further movement of the bag for operating the adhesive applying means to apply adhesive to the tabs as they are moved therebeneath, the adhesive applying means including adhesive applying gun means mounted on the adjustment frame vertically above the path of movement of the tabs as the bag is conveyed rearwardly of the tab forming means.

21. Apparatus for forming a sealed bag top closure on a bag filled with product comprising a main frame, means mounted on the main frame for conveying a bag filled with product in a given longitudinal rearward direction, said bag having front, rear and side wall portions extending above the level of product in the bag and above the bag conveyor means, means for driving the conveyor means to move a bag in said direction, control means connected to the conveyor drive means for deactuating the drive means when the bag has been conveyed to a given location, an adjustment frame, means mounted on the main frame and connected to the adjustment frame for mounting the adjustment frame above said bag conveyor means and vertically adjustably positioning the adjustment frame relative the bag conveyor means, means mounted on the adjustment frame and movable relative thereto for folding the front and rear wall portions toward one another into generally horizontally overlying relationship to the product in the bag and said side wall portions into oppositely, transversely outwardly extending tabs, the last mentioned means including an entry shoe, means swingably mounting said entry shoe on the adjustment frame for movement from a datum position forwardly of a bag at said location and at an elevation above the top edges of said bag to a position slightly above the product in the bag at said location in at least partial overlying relationship to the longitudinally forward portion of said product, an exit shoe, means movably mounting the exit shoe on the adjustment frame for movement from a datum position longitudinally rearwardly of a bag at said location to a position just above the product in the bag in at least partial overlying relationship to the rearward portion of said product, and means actuated in predetermined relationship to the bag conveyor means moving said bag to said given location for operating the shoe mounting means to move the shoes in timed relationship from their datum positions to respectively engage the vertically extending front and rear wall portions of the bag at said location at about the same time and fold said portions into overlying relationship relative the product, and thereafter return said shoes to their datum positions, said control means including means for reactuating said conveyor drive means to drive the conveyor means to further move the bag after the tabs have been formed, and means mounted on the adjustment frame above the bag conveyor means in longitudinally rearward spaced relationship to the rear portion folding means for folding and sealing said tabs relative the folded front and rear wall portions to form a folded, sealed bag top closure as said bag is being further conveyed.

22. The apparatus of claim 21 further characterized in that the folding and sealing means includes first means mounted on the adjustment frame for applying adhesive to one of the tabs as it is moved therebeneath, second means for applying adhesive to the other of the tabs as it is moved therebeneath, means mounted on the frame for mounting and transversely reciprocating the second means in timed relationship to the movement of the other tab therebeneath, and means mounted on the adjustment frame for holding the tabs with the adhesive thereon in sealing relationship with one another and the front and rear wall portions.

23. The apparatus of claim 22 further characterized in that the exit shoe includes a main body portion, that the exit shoe moving means includes means for mounting the exit shoe for reciprocal longitudinal movement, that the shoe operating means includes means for delaying the return movement of the exit shoe toward its datum position until the bag has been further conveyed relative the exit shoe and both the folded front and rear wall portions are at least partially under the main body portion and thence operate the shoe operating means to move the exit shoe toward its datum position at the same rate that the bag is further conveyed by the conveyor means.

24. The apparatus of claim 23 further characterized in that the means for folding the tabs with the adhesive thereon includes a first folder blade for folding said one tab to at least partially extend over said front and rear wall portions and a second folder blade on the adjustment frame longitudinally rearwardly offset from the first folder blade for folding said other tab to at least in part extend over said one tab, said exit shoe having a pair of transversely spaced, rearwardly extending extensions joined to the main body to in the exit shoe datum condition respectively at least in part underlie the adjacent folder blade to facilitate obtaining a tight fold as the tabs are folded by the respective folder blades.

25. The apparatus of claim 21 further characterized in that control means includes means automatically actuated by the deactuation of the conveyor drive means for operating the adjustment frame mounting and moving means to vertically move the adjustment frame to a preselected height relative the product in the bag at said location, and upon the adjustment frame being at said preselected height, actuating the shoe operating means.

26. The apparatus of claim 25 further characterized in that the automatically actuated means includes a vertically elongated feeler member mounted on the adjustment frame above said location for limited slidable movement from a datum position relative the adjustment frame that is substantially spaced from the conveyor means, to a second position sufficiently vertically below said datum position to engage product in the bag when the adjustment frame is at said preselected height, means on the adjustment frame for retaining said feeler member in its datum position until the bag has been conveyed to said location, then permit the feeler member to move toward its second position, and after the adjustment frame has been moved to the preselected height above the product, return the feeler member to its datum position, and that the control means includes means connected to the feeler member retaining means for operating it in the aforementioned manner, the feeler control means being operatively connected to conveyor drive deactuating means.

27. The apparatus of claim 26 further characterized in that there is provided means mounted on the adjustment frame for moving the tabs into a general horizontal condition and creasing the tabs prior to the tabs being folded and sealed to form a bag top closure.

28. The apparatus of claim 26 further characterized in that there is provided a pair of tables that each have a top surface, each table being mounted on the adjustment frame to have its top surface at approximately the same height as the product level when the adjustment frame is at a said pre-selected height and to have one table on either transverse side of the bag at said location, means mounted on the adjustment frame for pressing the tabs against the transversely adjacent table to crease said tabs, and means operatively connected to the shoe operating means for operating the creasing means to crease the tabs, and upon the tabs being creased, operating the reactuation means to reactuate the conveyor drive means.

29. The apparatus of claim 28 further characterized in that the means for folding said front, rear and side wall portions includes a pair of elongated arms each having an end portion, means mounting said arms on the adjustment frame for movement about transversely spaced, longitudinal axes to move from a datum position above the bag at said location, thence said end portions into the bag and thereafter against said side wall portions to move them transversely away from one another to facilitate forming the tabs, and means operatively connected to the entry shoe movably mounting means and to said arm mounting means for moving said arms from their datum position as the entry shoe is moved and the said end portions into the bag prior to the entry shoe engaging the front wall.

30. In apparatus for forming transversely extending tabs on a bag at a given location that is filled with product and has vertical front, rear and side wall portions extending vertically above the product comprising a longitudinally extending frame, means on the frame for supporting the bag at said location, an entry shoe, means mounted on the frame for mounting the entry shoe for movement between a datum position longitudinally forwardly for the bag and at a higher elevation than the top edges of said wall portions, a second position at an elevation slightly above the product in the bag and in engagement with the front wall portion, and a third position overlying the front wall portion and closely adjacent to the forward portion of the product in the bag, an exit shoe, means mounted on the frame for mounting the exit shoe for movement between a datum position longitudinally rearwardly of the bag, a second position at about the product level and in abutting engagement with the rear wall portion, and a third position just above the product in the bag and at least in partial overlying relationship to the rearward portion of said product, means on the frame and connected to the entry shoe mounting means for operating the entry shoe mounting means to move the entry shoe from its datum position and successively through its second and third positions and thence return the entry shoe to its datum position, means on the frame for operating the exit shoe mounting means to successively move the exit shoe from its datum position and successively through its second and third position and thence return the exit shoe to its datum position, said shoes in being moved between their second and third positions respectively folding the front and rear wall portion into close overlying relationship with the product, a pair of elongated bag opening members, means mounted on the frame for mounting the bag opening members for movement from a datum position above the top edges of the vertical wall portions and thence into the bag to abut against the side wall portions and thereafter force said side wall portions transversely away from one another, operating means connected to the bag opening member mounting means and operatively connected to the entry shoe mounting means for moving the bag opening members into abutting engagement with the side wall portions at about the same time the exit and entry shoes initially engage the front and rear wall portions to facilitate forming the side walls into transversely extending tabs, and control means for the exit and entry shoe operating means to control the operation of said exit and entry operating means so that the exit shoe and entry shoe engage the rear and front wall portions at about the same time.

31. The apparatus of claim 30 further characterized in that the bag opening members are mounted by their mounting means to move in transverse vertical planes that are longitudinally intermediate the entry shoe and exit shoe in their third positions.

32. In apparatus for creasing transversely, oppositely extending tabs on a bag comprising a longitudinally extending frame, a folding table mounted on the frame on either transverse side of the bag beneath the respective tab and having an inner longitudinal edge closely adjacent the juncture of the tab with the remainder of the bag, a pair of longitudinally elongated creasing rollers, an elongated arm member for each roller, each arm member having one end portion connected to the respective roller, means for mounting opposite ends of said arm members to pivot about a longitudinal axis in opposite angular directions, means mounted on the frame and connected to the pivot mounting means for moving the pivot mounting means from a roller datum position in which the rollers are closely adjacent to one another and a substantially vertical distance above the tabs and moving the pivot mounting means downwardly to a sufficiently lower elevation that initially the rollers engage and press the tabs against the respective tables, thence move transversely outwardly across the tabs, and thereafter elevate the pivot mounting means to return the rollers to a datum condition, first cam follower means mounted on each of said arm members, cam means mounted on each of the tables in position for engagement by the respective first cam follower means to force the respective first cam follower means and thereby the rollers transversely apart as the rollers are moved downwardly toward the tables, second cam follower means connected to each roller, trip cam means for each roller mounted on the frame for movement to permit the respective second cam follower means to pass therebeneath as the rollers move transversely outwardly to crease the tabs and thence return to a position to be engaged by the respective second cam follower means for forcing the rollers to return to their datum position through a path of movement out of engagement with the tabs as the pivot mounting means is elevated.

33. The apparatus of claim 32 further characterized in that each trip cam means includes a pivot mounting member having a longitudinal pivot axis mounted on the frame above the respective table transversely adjacent the inner edge of the table, a trip cam member having one end portion pivotally mounted on said mounting member, an opposite portion end abutting against the table a greater distance transversely outwardly than that which the tab will extend over the table that is to be creased, and an intermediate portion extending between said end portions that is arcuately curved to extend transversely outwardly and downwardly from the first end portion toward the second end portion, said rollers having the second cam follower means in a position to pivot the respective trip cam member to pass therebeneath after the tabs have been creased, and upon the pivot mounting means being elevated to its datum position, move said second cam follower means into engagement with the respective trip cam member.

34. The apparatus of claim 32 further characterized in that the pivot mounting means includes means for retaining the arm members in a minimum adjusted, spaced, angular relationship in the roller datum position, and means connected to the arm members for resiliently urging the arm members to pivot toward one another.

35. Apparatus for forming a sealed bag top closure on a bag filled with product comprising a main frame, means mounted on the main frame for conveying a bag filled with product in a given longitudinal direction, said bag having front, rear and side wall portions extending above the level of product in the bag and above the bag conveyor means, an adjustment frame, means mounted on the main frame and connected to the adjustment frame for mounting the adjustment frame above the bag conveyor means and vertically adjustably positioning the adjustment frame relative the bag conveyor means, two folding tables each having a top surface, means mounted on adjustment frame for mounting said tables above the bag conveyor means, and at the same elevation and in transverse spaced relationship on the opposite sides of the bag being conveyed by said bag conveyor means, product level determining means mounted on the adjustment frame for limited movement relative the adjustment frame between a first position a substantial distance vertically above the bag at a given location on the bag conveyor means and a position to engage product in the bag when the table top surfaces are at substantially the same elevation as the product level in the bag at said location, means operated by the product level determining means for operating the adjustment frame moving means in a proper vertical direction until adjustment frame moves said tables to substantially the same level as the product level and thereafter return the product level determining means to its first position, an entry shoe, means mountably moving said entry shoe on the adjustment frame for movement from a datum position longitudinally forward of a bag at said location and a second position closely adjacent the product and in overlying relationship to the forward portion of the product when the tables are at substantially the same level as the product, an exit shoe, means movably mounting the exit shoe for reciprocal movement from a datum position rearwardly of the bag at said given location and a second position in overlying relationship to the rearward portion of the product in the bag at said given location, first operating means actuated by the product level determining operating means engaging product with the adjustment frame positioning the tables at about the elevation of the product level for moving said shoes from their datum positions toward their second positions to engage the front and rear wall portions at about the same time and fold said portions into overlying relationship with the product as said shoes move to their second positions, means mounted on the frame and operatively connected to the entry shoe moving means for extending into the bag to abut against the side wall portions to force said side wall portions transversely outwardly of one another and act in cooperation with said shoes to form transversely extending tabs as the shoes fold said front and rear wall portions into overlying relationship with the product, creasing means mounted on the adjustment frame for forcing the formed tabs into abutting relationship with the adjacent table to form sharply creased edges, means actuated by the actuation of the first means for actuating the creasing means in timed relationship to crease the tabs after the exit and entry shoes have been moved to their second positions, means mounted on said adjustment frame longitudinally rearwardly of the creasing means and adjacent the bag conveyor means for applying adhesive to the respective tab as the tab is conveyed therebeneath, means mounted on the tables longitudinally rearwardly of the adhesive applying means and above the bag conveyor means for folding the tabs with the adhesive thereon into abutting relationship with the front and rear wall folded portions and one another to form the sealed bag top closure, means for driving the bag conveyor means, control means for stopping the bag conveyor means when the bag is at said location, and actuating the product level determining operating means, and restarting the conveyor drive means to operate the bag conveyor means to further convey the bag after the tabs have been creased, and adhesive applicator control means mounted on the bag conveyor means for actuating the adhesive applicators to apply adhesive to the tabs as the bag is further conveyed.

36. The apparatus of claim 35 further characterized in that the creasing means includes means for holding the creased tabs adjacent said tables as the creasing rollers initially move off the tabs and begin their return movement toward their datum position, means mounted on the tables for holding the tabs in a generally flat condition after the bag conveyor means has further moved a bag from beneath the tab hold-down means and as the tabs are moved to a position beneath the adhesive applicator means, that the conveyor means includes a bottom conveyor assembly, and a pair of side conveyor assemblies for abutting against opposite side walls of the bag, and that the table mounting means includes means for adjustably transversely spacing the tables relative to one another.

37. Apparatus for forming a sealed bag top closure on a bag filled with product comprising a frame, means mounted on the frame for conveying a bag filled with product in a longitudinal rearward direction, said bag having generally vertical front, rear and side wall portions extending above the level of product in the bag and the bag conveyor means, means operated in a predetermined relationship relative the bag conveyor means for folding said wall portions and sealing the wall portions to form a folded, sealed bag top closure in relatively tight overlying relationship relative the product, first means mounted on the frame for mounting the folding and sealing means in overhanging relationship to the bag conveyor means and vertically moving the folding and sealing means within a limited range, said folding and sealing means includes second means for folding said vertical front and rear wall portions into overlying relationship to the product and the side wall portions into tabs extending transversely outwardly in opposite directions, means for applying adhesive to the upper surfaces of at least two of said portions after the tabs have been formed, means mounted on the first means for creasing the tabs prior to the application of adhesive and means longitudinally rearwardly of the adhesive applying means for folding said tabs into abutting relationship with the folded front and rear portions to form a sealed bag top closure, means for driving the bag conveyor means to move a bag in said direction, and control means for actuating the conveyor drive means to move a bag with said wall portions to a given location relative the folding and sealing means, thence operate said first means to adjustably vertically position the bag folding and sealing means at a proper elevation relative the level of the product in the bag, and thereafter operate the conveyor drive means and bag folding and sealing means relative to one another to form said closure, the control means including means for automatically stopping the conveyor drive means and thereafter actuating the second means, means for operating the creasing means to crease the tabs after the tabs have been formed, and means actuated by the creasing means finishing creasing the tabs to restart the conveyor drive means.

38. In apparatus for forming a sealed bag top closure on a bag filled with product comprising a frame, means mounted on the frame for conveying a bag filled with product in a longitudinal rearward direction, the above bag having vertical front, rear and side wall portions extending above the level of product in the bag and above the conveyor means, two transversely spaced tables on the frame at an elevation above the conveyor means and below the top edges of said vertical wall portions to have the bag conveyed therebetween by the conveyor means, means on the frame for folding said vertical wall portions to form a transversely, outwardly extending tab overlying each table, each tab having free peripheral edges, means for retaining said tabs in a generally flat condition relative said tables as the bag is conveyed, first gun applicator means for discharging adhesive including a first gun, means on the frame for mounting the first gun in position to discharge an adhesive on one of said tabs as it is retained in a generally flat condition, second adhesive applicator gun means including a second gun for downwardly discharging an adhesive, means on said frame for mounting and transversely moving the second gun above the other tab as it is retained in a generally flat condition, means for driving the conveyor means and operating the folding means, and means synchronized with the driving and operating means for operating the second gun mounting and moving means to transversely move and operate the second gun to spray an adhesive strip on said other tab that extends generally parallel to the other tab peripheral edges as the conveyor means conveys the bag to move said other tab beneath the second gun, said first gun means including means operated by the movement of the second gun mounting and moving means for operating the first gun to spray a first spot of adhesive on the longitudinal forward portion the said one tab and subsequently discharge a second spot of adhesive on the longitudinal forward portion of said one tab at a location substantially spaced from said first spot.

39. In apparatus for forming a sealed bag top closure on a bag filled with product comprising a frame, means mounted on the frame for conveying a bag filled with product in a longitudinal rearward direction, the above bag having vertical front, rear and side wall portions extending above the level of product in the bag and above the conveyor means, two transversely spaced tables on the frame at an elevation above the conveyor means and below the top edges of said vertical wall portions to have the bag conveyed therebetween by the conveyor means, means on the frame for folding said vertical wall portions to form a transversely, outwardly extending tab overlying each table, each tab having free peripheral edges, the wall portion folding means including an exit shoe for folding the rear wall portion, said shoe having a main body portion and a pair of transversely spaced extensions joined to the main body to extend rearwardly thereof, means for retaining said tabs in a generally flat condition relative said tables as the bag is conveyed, first gun applicator means for discharging adhesive including a first gun, means on the frame for mounting the first gun in position to discharge an adhesive on one of said tabs as it is retained in a generally flat condition, second adhesive applicator gun means including a second gun for downwardly discharging an adhesive, means on said frame for mounting and transversely moving the second gun above the other tab as it is retained in a generally flat condition, means for driving the conveyor means and operating the folding means, and means sychronized with the driving and operating means for operating the second gun mounting and moving means to transversely move and operate the second gun to spray an adhesive strip on said other tab that extends generally parallel to the other tab peripheral edges as the conveyor means conveys the bag to move said other tab beneath the second gun, the conveyor drive and bag folding means includes means for driving the conveyor means, and means for mounting the exit shoe and operate it relative the conveyor means to move the exit shoe forwardly from a datum position to first fold the rear wall portion, thence remain stationary while the conveyor means moves the bag with the folded front and rear wall portions relative to the exit shoe sufficiently that a substantial portion of said folded front and rear wall portions underlie the main body of the exit shoe, and thence move the exit shoe in overlying relationship to said front and rear wall portions rearwardly toward its datum position as adhesive is sprayed onto said tabs, and means attached to the tables for acting in cooperation with said extensions in the exit shoe datum position to fold the tabs having adhesive thereon into sealing relationship with one another and the front and rear wall portions as the bag is being conveyed.

References Cited

UNITED STATES PATENTS

| | | | |
|---|---|---|---|
| 2,324,401 | 7/1943 | Kimball | 53—75 |
| 2,550,928 | 5/1951 | Kay | 53—75 |
| 2,584,465 | 2/1952 | Kall | 53—75 |
| 2,584,529 | 2/1952 | Allen | 53—378 |
| 2,893,184 | 7/1959 | Lienart | 53—75 |
| 2,909,875 | 10/1959 | Imbs | 53—76 |
| 2,952,960 | 9/1960 | Talbot et al. | 53—378 X |
| 3,085,376 | 4/1963 | Ferguson et al. | 53—75 |

TRAVIS S. McGEHEE, *Primary Examiner.*

ROBERT L. FARRIS, *Assistant Examiner.*

U.S. Cl. X.R.

53—78, 378